US009228051B2

(12) United States Patent
Carman, Jr. et al.

(10) Patent No.: US 9,228,051 B2
(45) Date of Patent: *Jan. 5, 2016

(54) POLYESTER COMPOSITIONS CONTAINING FURANDICARBOXYLIC ACID OR AN ESTER THEREOF AND CYCLOHEXANEDIMETHANOL

(71) Applicant: Eastman Chemical Company, Kingsport, TN (US)

(72) Inventors: Howard Smith Carman, Jr., Blountville, TN (US); Jack Irvin Killman, Jr., Johnson City, TN (US); Emmett Dudley Crawford, Kingsport, TN (US); Jason Christopher Jenkins, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,471

(22) Filed: Oct. 10, 2012

(65) Prior Publication Data

US 2013/0095268 A1 Apr. 18, 2013

Related U.S. Application Data

(60) Provisional application No. 61/547,222, filed on Oct. 14, 2011, provisional application No. 61/547,224, filed on Oct. 14, 2011, provisional application No. 61/547,228, filed on Oct. 14, 2011, provisional application No. 61/547,233, filed on Oct. 14, 2011, provisional application No. 61/547,236, filed on Oct. 14, 2011, provisional application No. 61/547,241, filed on Oct. 14, 2011.

(51) Int. Cl.
*C08G 63/199* (2006.01)
*C08G 63/181* (2006.01)

(52) U.S. Cl.
CPC .......... *C08G 63/199* (2013.01); *C08G 63/181* (2013.01); *Y10T 428/1352* (2015.01); *Y10T 428/1397* (2015.01); *Y10T 428/249953* (2015.04)

(58) Field of Classification Search
CPC ......... C08L 67/00; C08L 67/02; C08L 67/04; C08L 69/00; C08L 2666/18; C08G 63/16; C08G 63/99; C08G 63/199
USPC ......... 428/35.7, 36.5, 36.6, 36.7, 36.9, 36.91, 428/36.92; 528/271, 272, 279, 294, 295.5, 528/300–308, 308.6, 308.7
See application file for complete search history.

(56) References Cited

U.S. PATENT DOCUMENTS

| | | |
|---|---|---|
| 2,551,731 A | 5/1951 | Drewitt et al. |
| 3,203,963 A | 8/1965 | Hales et al. |
| 3,225,066 A | 12/1965 | Lew |
| 3,326,944 A | 6/1967 | Lew |
| 3,546,255 A | 12/1970 | Duennenberger et al. |
| 3,852,247 A | 12/1974 | Vizurraga |
| 4,405,736 A | 9/1983 | Kubota et al. |
| 4,876,327 A | 10/1989 | Vriesema et al. |
| 5,958,581 A | 9/1999 | Khanarian et al. |
| 5,959,066 A | 9/1999 | Charbonneau et al. |
| 6,025,061 A | 2/2000 | Khanarian et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,103,825 A | 8/2000 | Frischinger et al. |
| 6,107,447 A | 8/2000 | Kreuder et al. |
| 6,126,992 A | 10/2000 | Khanarian et al. |
| 6,140,422 A | 10/2000 | Khanarian et al. |
| 6,342,300 B1 | 1/2002 | Bengs et al. |
| 6,359,070 B1 | 3/2002 | Khanarian et al. |
| 6,737,481 B1 | 5/2004 | Kurian et al. |
| 6,914,120 B2 * | 7/2005 | Germroth et al. ............ 528/300 |
| 7,052,764 B2 | 5/2006 | Chang et al. |
| 7,385,081 B1 | 6/2008 | Gong |
| 7,638,592 B2 | 12/2009 | Benecke et al. |
| 2006/0287479 A1 | 12/2006 | Crawford et al. |
| 2006/0287496 A1 | 12/2006 | Crawford et al. |
| 2007/0015081 A1 | 1/2007 | van den Bogerd et al. |
| 2008/0081883 A1 | 4/2008 | King et al. |
| 2008/0182944 A1 | 7/2008 | Benecke et al. |
| 2009/0018264 A1 | 1/2009 | Fuseya |
| 2009/0124763 A1 | 5/2009 | Matsuda et al. |

(Continued)

FOREIGN PATENT DOCUMENTS

| | | |
|---|---|---|
| CA | 2235270 A1 | 4/1997 |
| EP | 741134 A1 | 11/1996 |

(Continued)

OTHER PUBLICATIONS

Akutin et al., N.N. USSR Patent, 162962, 1964; Chem. Abstr. 1964, 61, p. 8441e.
Lewkowski, J., "Synthesis, chemistry and applications of 5-hydroxymethylfurfural and its derivatives." Arkovoc (i), pp. 17-54 (Aug. 2001).
Lukes et al., CS Patent, 87340 (1959); Chem. Abstr. 1961, 55, p. 17084.
Manasek et al., 1963, 6, 35; Chem. Abstr. 1964, 60, p. 8180a.
Rodivilowa et al., Khim. Tekhnol. 11 1968, 7, 818; Chem. Abstr. 1969, 70, p. 4685v.
Sanderson, R. D., Schneider, D.F. and Schreuder, I. (1994), Synthesis and evaluation of dialkyl furan-2,5-dicarboxylates as plasticizers for PVC. J. Appl. Polym. Sci., 53: 1785-1793.

(Continued)

*Primary Examiner* — Walter B Aughenbaugh
(74) *Attorney, Agent, or Firm* — Phan Law Group PLLC

(57) ABSTRACT

Described are polyesters comprising (a) a dicarboxylic acid component comprising 2,5-furandicarboxylic acid residues and optionally, aromatic dicarboxylic acid residues and/or aliphatic dicarboxylic acid residues, and (b) a glycol component comprising 1,4-cyclohexanedimethanol residues and residues of a modifying glycol. The polyesters may be manufactured into articles such as fibers, films, bottles, coatings, or sheets.

20 Claims, 1 Drawing Sheet

(56) References Cited

U.S. PATENT DOCUMENTS

| | | | |
|---|---|---|---|
| 2009/0124829 A1 | 5/2009 | Gong | |
| 2009/0143602 A1 | 6/2009 | Benecke et al. | |
| 2010/0081774 A1 | 4/2010 | Benecke et al. | |
| 2010/0174044 A1 | 7/2010 | Eritate | |
| 2010/0331568 A1 | 12/2010 | Brandvold | |

FOREIGN PATENT DOCUMENTS

| | | |
|---|---|---|
| EP | 0856025 | 8/1998 |
| FR | 1508465 A | 1/1968 |
| FR | 2723946 A1 | 8/1994 |
| GB | 819438 | 9/1959 |
| JP | 2008291243 A | 12/2008 |
| JP | 2008291244 A | 12/2008 |
| JP | 2008308578 A | 12/2008 |
| JP | 2009215467 A | 9/2009 |
| JP | 2009263509 A | 11/2009 |
| WO | 2009118377 A1 | 10/2009 |
| WO | 2009135921 A1 | 11/2009 |
| WO | 2010069531 A1 | 6/2010 |
| WO | 2010077133 A1 | 7/2010 |
| WO | 2010140599 A1 | 12/2010 |
| WO | 2010151346 A1 | 12/2010 |
| WO | 2011023491 A1 | 3/2011 |
| WO | 2011023590 A1 | 3/2011 |
| WO | 2011124639 A1 | 10/2011 |
| WO | 2012005645 A1 | 1/2012 |
| WO | 2012026861 A1 | 3/2012 |

OTHER PUBLICATIONS

Gruter, Gert-Jan, Furanics for Plastics: Sugar-derived polymers by chemical catalysis A range of next generation bioplastics from carbohydrates, Avantium, 4th Annual Biopolymers Symposium, Sep. 29, 2009, 45 pages, Chicago.

USPTO Office Action for U.S. Appl. No. 13/648,492 dated Jan. 17, 2013.

USPTO Office Action for U.S. Appl. No. 13/648,508 dated Jan. 18, 2013.

USPTO Office Action for U.S. Appl. No. 13/648,519 dated Jan. 18, 2013.

USPTO Office Action for U.S. Appl. No. 13/648,471 dated Sep. 12, 2013.

Notification of transmittal of the International Search Report and the Written Opinion of the International Searching Authority or the declaration date of mailing Mar. 25, 2013, received in International Application No. PCT/US2012/059664, Filing Date: Oct. 11, 2012.

Notification of transmittal of the International Search Report and the Written Opinion of the International Searching Authority or the declaration date of mailing Mar. 22, 2013, received in International Application No. PCT/US2012/059662, Filing Date: Oct. 11, 2012.

USPTO Non-Final Office Action in U.S. Appl. No. 13/648,479 dated Jul. 24, 2015.

USPTO Non-Final Office Action in U.S. Appl. No. 13/648,534 dated Jul. 27, 2015.

USPTO Non-Final Office Action in U.S. Appl. No. 13/648,479 dated Oct. 14, 2014.

USPTO Final Office Action in U.S. Appl. No. 13/648,479 dated Feb. 3, 2015.

USPTO Advisory Action in U.S. Appl. No. 13/648,479 dated May 12, 2015.

USPTO Advisory Action in U.S. Appl. No. 13/648,479 dated Jun. 12, 2015.

USPTO Non-Final Office Action in U.S. Appl. No. 13/648,534 dated Oct. 16, 2014.

USPTO Final Office Action in U.S. Appl. No. 13/648,534 dated Feb. 5, 2015.

USPTO Advisory Action in U.S. Appl. No. 13/648,534 dated May 11, 2015.

USPTO Advisory Office Action in U.S. Appl. No. 13/648,534 dated Jun. 15, 2015.

* cited by examiner

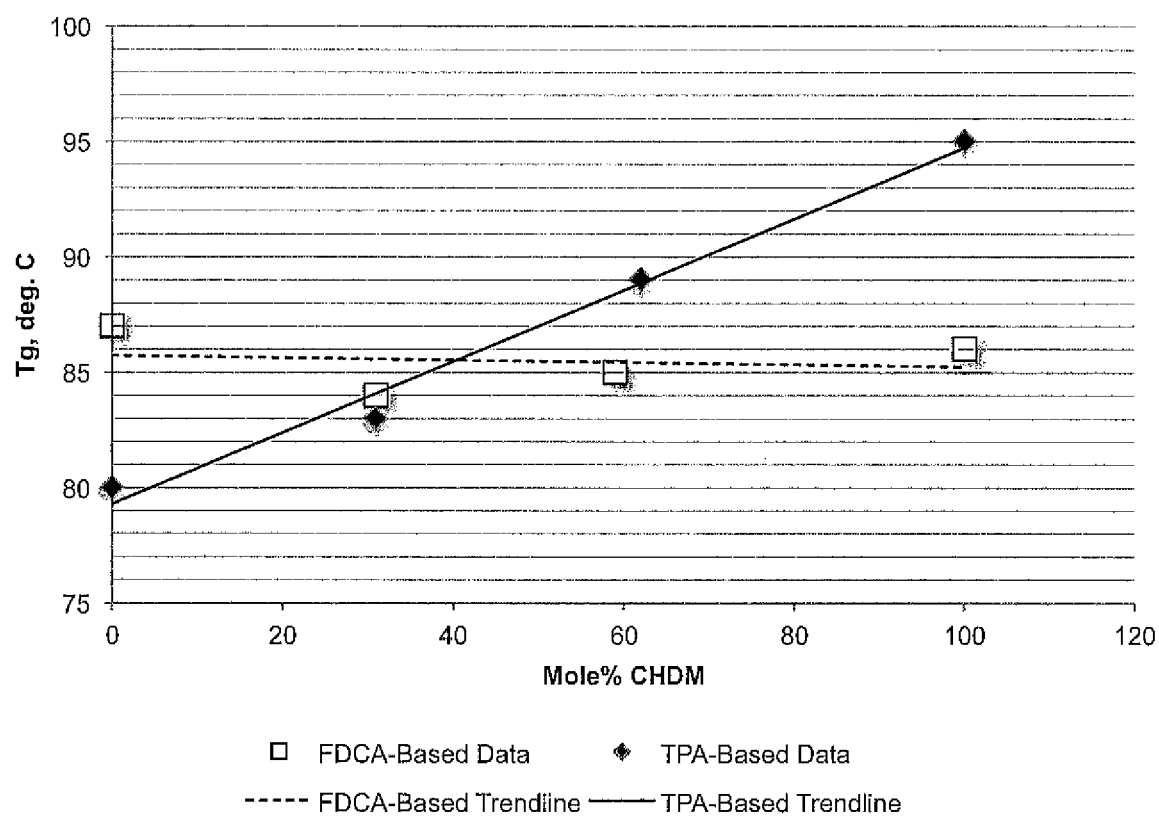

POLYESTER COMPOSITIONS CONTAINING FURANDICARBOXYLIC ACID OR AN ESTER THEREOF AND CYCLOHEXANEDIMETHANOL

FIELD OF THE INVENTION

The present invention generally relates to polyester compositions made from 2,5-furandicarboxylic acid or an ester thereof or mixtures thereof, and 1,4-cyclohexanedimethanol.

BACKGROUND OF THE INVENTION

Homopolymers based on 2,5-furandicarboxylic acid or an ester thereof and 1,4-cyclohexanedimethanol are known in the art.

SUMMARY OF THE INVENTION

It is believed that certain copolyester compositions made from 2,5-furandicarboxylic acid, an ester thereof, or mixtures thereof, and 1,4-cyclohexanedimethanol are superior to polyesters known in the art with respect to stable glass transition temperatures. Good barrier properties have also been observed.

It is generally known that the more cyclohexanedimethanol that is added to a polyester containing terephthalic acid, the greater its glass transition temperature.

In certain embodiments of this invention, it has been surprisingly found that the more that cyclohexanedimethanol is added to a polyester containing 2,5-furandicarboxylic acid, the glass transition temperature remains stable.

In one aspect, the invention relates to a polyester composition comprising at least one polyester which comprises:
(a) a dicarboxylic acid component comprising:
i) 70 to 100 mole % of 2,5-furandicarboxylic acid and/or an ester thereof;
ii) 0 to 30 mole % of other aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 0.01 to 99 mole % of 1,4-cyclohexanedimethanol residues, and
ii) 1 to 99.99 mole % of residues of at least one modifying glycol;
wherein the total mole % of the dicarboxylic acid component is 100 mole %, and the total mole % of the glycol component is 100 mole %.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 1 to 99 mole % of 1,4-cyclohexanedimethanol residues; and
ii) 1 to 99 mole % of residues of 2,2,4,4-tetramethyl-1,3-cyclobutanediol,
wherein the total mole % of the dicarboxylic acid component is 100 mole %, and the total mole % of the glycol component is 100 mole %.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 1 to 99 mole % of 1,4-cyclohexanedimethanol residues; and
ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.10 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 20 to 99 mole % of 1,4-cyclohexanedimethanol residues; and
ii) 1 to 80 mole % of residues of 2,2,4,4-tetramethyl-1,3-cyclobutanediol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 50 to 99 mole % of 1,4-cyclohexanedimethanol residues; and
ii) 1 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 50 to 80 mole % of 1,4-cyclohexanedimethanol residues; and
   ii) 20 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 60 to 80 mole % of 1,4-cyclohexanedimethanol residues; and
   ii) 20 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 70 to 80 mole % of 1,4-cyclohexanedimethanol residues; and
   ii) 20 to 30 mole % of residues of at least one modifying glycol,
wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 55 to 70 mole % of 1,4-cyclohexanedimethanol residues; and
   ii) 30 to 45 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 60 to 85 mole % of 1,4-cyclohexanedimethanol residues; and
   ii) 15 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
   i) 70 to 100 mole % of residues of furandicarboxylic acid and/or an ester thereof;
   ii) 0 to 30 mole % of aromatic dicarboxylic acid residues having up to 20 carbon atoms; and
   iii) 0 to 30 mole % of aliphatic dicarboxylic acid residues having up to 16 carbon atoms; and
(b) a glycol component comprising:
   i) 85 to 99 mole % of 1,4-cyclohexanedimethanol residues; and
   ii) 1 to 15 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 20 to 50 mole % of 1,4-cyclohexanedimethanol residues; and
  ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 25 to 35 mole % of 1,4-cyclohexanedimethanol residues; and
  ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 30 to 35 mole % of 1,4-cyclohexanedimethanol residues; and
  ii) 65 to 70 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 1 to 99 mole % of 1,4-cyclohexanedimethanol residues; and
  ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.10 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 20 to 99 mole % of 1,4-cyclohexanedimethanol residues; and
  ii) 1 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:

i) 50 to 99 mole % of 1,4-cyclohexanedimethanol residues; and
ii) 1 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 50 to 80 mole % of 1,4-cyclohexanedimethanol residues; and
ii) 20 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and (b) a glycol component comprising:
i) 70 to 80 mole % of 1,4-cyclohexanedimethanol residues; and
ii) 20 to 30 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 85 mole % of 1,4-cyclohexanedimethanol residues; and
ii) 15 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and iii) 0 to 20 mole % of aliphatic dicarboxylic acid residues having up to 16 carbon atoms; and
(b) a glycol component comprising:
i) 85 to 99 mole % of 1,4-cyclohexanedimethanol residues; and
ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 20 to 50 mole % of 1,4-cyclohexanedimethanol residues; and
ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 25 to 35 mole % of 1,4-cyclohexanedimethanol residues; and
ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 30 to 35 mole % of 1,4-cyclohexanedimethanol residues; and
ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 1 to 99 mole % of 1,4-cyclohexanedimethanol residues; and
ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.10 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 20 to 99 mole % of 1,4-cyclohexanedimethanol residues; and
ii) 1 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 50 to 99 mole % of 1,4-cyclohexanedimethanol residues; and ii) 1 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:

(a) a dicarboxylic acid component comprising:

i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 50 to 80 mole % of 1,4-cyclohexanedimethanol residues; and ii) 20 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:

(a) a dicarboxylic acid component comprising:

i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 60 to 80 mole % of 1,4-cyclohexanedimethanol residues; and ii) 20 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:

(a) a dicarboxylic acid component comprising:

i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 70 to 80 mole % of 1,4-cyclohexanedimethanol residues; and ii) 20 to 30 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:

(a) a dicarboxylic acid component comprising:

i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 55 to 70 mole % of 1,4-cyclohexanedimethanol residues; and ii) 30 to 45 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:

(a) a dicarboxylic acid component comprising:

i) 70 to 100 mole % of residues of furandicarboxylic acid and/or an ester thereof;

ii) 0 to 30 mole % of aromatic dicarboxylic acid residues having up to 20 carbon atoms; and iii) 0 to 30 mole % of aliphatic dicarboxylic acid residues having up to 16 carbon atoms; and (b) a glycol component comprising:

i) 60 to 85 mole % of 1,4-cyclohexanedimethanol residues; and ii) 15 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 85 to 99 mole % of 1,4-cyclohexanedimethanol residues; and
  ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 20 to 50 mole % of 1,4-cyclohexanedimethanol residues; and
  ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 25 to 35 mole % of 1,4-cyclohexanedimethanol residues; and
  ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 30 to 35 mole % of 1,4-cyclohexanedimethanol residues; and
  ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 1 to 99 mole % of 1,4-cyclohexanedimethanol residues; and
  ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.10 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 20 to 99 mole % of 1,4-cyclohexanedimethanol residues; and
  ii) 1 to 80 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 50 to 99 mole % of 1,4-cyclohexanedimethanol residues; and
ii) 1 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 50 to 80 mole % of 1,4-cyclohexanedimethanol residues; and
ii) 20 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 70 to 80 mole % of 1,4-cyclohexanedimethanol residues; and
ii) 20 to 30 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol, wherein the total mole % of the dicarboxylic acid component is 100 mole %, and the total mole % of the glycol component is 100 mole %;

wherein the inherent viscosity of said polyester is from 0.35 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and iii) 0 to 20 mole % of aliphatic dicarboxylic acid residues having up to 16 carbon atoms; and
(b) a glycol component comprising:
  i) 60 to 85 mole % of 1,4-cyclohexanedimethanol residues; and
  ii) 15 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 85 to 99 mole % of 1,4-cyclohexanedimethanol residues; and
  ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 50 to 80 mole % of 1,4-cyclohexanedimethanol residues; and
  ii) 20 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 65 to 75 mole % of 1,4-cyclohexanedimethanol residues; and
  ii) 25 to 35 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 30 to 35 mole % of 1,4-cyclohexanedimethanol residues; and
  ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.35 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 1 to 99 mole % of 1,4-cyclohexanedimethanol residues; and
  ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 50 to 99 mole % of 1,4-cyclohexanedimethanol residues; and
ii) 1 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 50 to 80 mole % of 1,4-cyclohexanedimethanol residues; and
ii) 20 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 70 to 80 mole % of 1,4-cyclohexanedimethanol residues; and
ii) 20 to 30 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 60 to 85 mole % of 1,4-cyclohexanedimethanol residues; and
ii) 15 to 40 mole % of residues of at least one modifying glycol,
wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
 (a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
 (b) a glycol component comprising:
  i) 85 to 99 mole % of 1,4-cyclohexanedimethanol residues; and
  ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
 (a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
 (b) a glycol component comprising:
  i) 20 to 50 mole % of 1,4-cyclohexanedimethanol residues; and
  ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
 (a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
 (b) a glycol component comprising:
  i) 25 to 35 mole % of 1,4-cyclohexanedimethanol residues; and
  ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
 (a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
 (b) a glycol component comprising:
  i) 30 to 35 mole % of 1,4-cyclohexanedimethanol residues; and
  ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
 (a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
 (b) a glycol component comprising:
  i) 1 to 99 mole % of 1,4-cyclohexanedimethanol residues; and
  ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 50° C. to 150° C.

In one aspect, this invention relates to a polyester composition comprising at least one polyester which comprises:
 (a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
 (b) a glycol component comprising:
  i) 50 to 99 mole % of 1,4-cyclohexanedimethanol residues; and ii) 1 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 50 to 80 mole % of 1,4-cyclohexanedimethanol residues; and
ii) 20 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 70 to 80 mole % of 1,4-cyclohexanedimethanol residues; and
ii) 20 to 30 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 85 mole % of 1,4-cyclohexanedimethanol residues; and
ii) 15 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and iii) 0 to 20 mole % of aliphatic dicarboxylic acid residues having up to 16 carbon atoms; and
(b) a glycol component comprising:
i) 85 to 99 mole % of 1,4-cyclohexanedimethanol residues; and
ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 20 to 50 mole % of 1,4-cyclohexanedimethanol residues; and
ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 25 to 35 mole % of 1,4-cyclohexanedimethanol residues; and
ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 30 to 35 mole % of 1,4-cyclohexanedimethanol residues; and
ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 50° C. to 150° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 1 to 99 mole % of 1,4-cyclohexanedimethanol residues; and
ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 50 to 99 mole % of 1,4-cyclohexanedimethanol residues; and
ii) 1 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;

ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 50 to 80 mole % of 1,4-cyclohexanedimethanol residues; and
ii) 20 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 70 to 80 mole % of 1,4-cyclohexanedimethanol residues; and
ii) 20 to 30 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 60 to 85 mole % of 1,4-cyclohexanedimethanol residues; and
ii) 15 to 40 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
i) 70 to 100 mole % of residues of furandicarboxylic acid and/or an ester thereof;
ii) 0 to 30 mole % of aromatic dicarboxylic acid residues having up to 20 carbon atoms; and
iii) 0 to 30 mole % of aliphatic dicarboxylic acid residues having up to 16 carbon atoms; and
(b) a glycol component comprising:
i) 85 to 99 mole % of 1,4-cyclohexanedimethanol residues; and
ii) 1 to 15 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 20 to 50 mole % of 1,4-cyclohexanedimethanol residues; and
  ii) 50 to 80 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 25 to 35 mole % of 1,4-cyclohexanedimethanol residues; and
  ii) 65 to 75 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 70 to 100 mole % of residues of furandicarboxylic acid and/or an ester thereof;
  ii) 0 to 30 mole % of aromatic dicarboxylic acid residues having up to 20 carbon atoms; and
  iii) 0 to 30 mole % of aliphatic dicarboxylic acid residues having up to 16 carbon atoms; and
(b) a glycol component comprising:
  i) 30 to 35 mole % of 1,4-cyclohexanedimethanol residues; and
  ii) 65 to 70 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 1 to 99 mole % of 1,4-cyclohexanedimethanol residues; and
  ii) 1 to 99 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 50 to 99 mole % of 1,4-cyclohexanedimethanol residues; and
  ii) 1 to 50 mole % of residues of at least one modifying glycol,
wherein the total mole % of the dicarboxylic acid component is 100 mole %, and the total mole % of the glycol component is 100 mole %;
wherein the inherent viscosity of said polyester is from 0.50 to 1.2 dL/g as determined in 60/40 (wt/wt) phenol/tetrachloroethane at a concentration of 0.5 g/100 ml at 25° C.; and
wherein the glass transition temperature is from 70° C. to 120° C.

In one aspect, this invention relates to a polyester composition comprising at least one polyester which comprises:
(a) a dicarboxylic acid component comprising:
  i) 80 to 100 mole % of residues of furandicarboxylic acid and/or an ester thereof;
  ii) 0 to 20 mole % of aromatic dicarboxylic acid residues having up to 20 carbon atoms; and
  iii) 0 to 20 mole % of aliphatic dicarboxylic acid residues having up to 16 carbon atoms; and
(b) a glycol component comprising:
  i) 50 to 80 mole % of 1,4-cyclohexanedimethanol residues; and
  ii) 20 to 50 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 80 mole % of 1,4-cyclohexanedimethanol residues; and
ii) 20 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 70 to 80 mole % of 1,4-cyclohexanedimethanol residues; and
ii) 20 to 30 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 55 to 70 mole % of 1,4-cyclohexanedimethanol residues; and
ii) 30 to 45 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 60 to 85 mole % of 1,4-cyclohexanedimethanol residues; and
ii) 15 to 40 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 85 to 99 mole % of 1,4-cyclohexanedimethanol residues; and
ii) 1 to 15 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and iii) 0 to 20 mole % of aliphatic dicarboxylic acid residues having up to 16 carbon atoms; and
(b) a glycol component comprising:
i) 20 to 50 mole % of 1,4-cyclohexanedimethanol residues; and
ii) 50 to 80 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 25 to 35 mole % of 1,4-cyclohexanedimethanol residues; and
ii) 65 to 75 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one aspect, this invention relates to a polyester composition comprising at least one polyester which comprises:
(a) a dicarboxylic acid component comprising:
i) 80 to 100 mole % of residues of furandicarboxylic acid and/or an ester thereof;
ii) 0 to 20 mole % of aromatic dicarboxylic acid residues having up to 20 carbon atoms; and
iii) 0 to 20 mole % of aliphatic dicarboxylic acid residues having up to 16 carbon atoms; and
(b) a glycol component comprising:
i) 30 to 35 mole % of 1,4-cyclohexanedimethanol residues; and
ii) 65 to 70 mole % of residues of at least one modifying glycol, wherein the total mole % of the dicarboxylic acid component is 100 mole %, and the total mole % of the glycol component is 100 mole %;

wherein the inherent viscosity of said polyester is from 0.50 to 1.2 dL/g as determined in 60/40 (wt/wt) phenol/tetrachloroethane at a concentration of 0.5 g/100 ml at 25° C.; and wherein the glass transition temperature is from 70° C. to 120° C.

In one embodiment, ethylene glycol can be a modifying glycol. In one embodiment, ethylene glycol can be a modifying glycol. In one embodiment, ethylene glycol can be the only modifying glycol. In one embodiment, 2,2,4,4-tetramethyl-1,3-cyclobutanediol can be a modifying glycol. In one embodiment, 2,2,4,4-tetramethyl-1,3-cyclobutanediol can be the only modifying glycol. In one embodiment, 2,2,4,4-tetramethyl-1,3-cyclobutanediol and ethylene glycol can be present as the modifying glycols.

In one embodiment, diethylene glycol may be present as an additional modifying glycol. Even if diethylene glycol is not specifically added, it is understood that diethylene glycol may be formed in situ and may be present in an embodiment where ethylene glycol is added as one of the monomers in the process of making the polyester. Even if diethylene glycol is not specifically added, it is also understood that diethylene glycol may be formed in situ and may be present in a minor amount such as less than 2-3 mole %. Certain embodiments of polyesters of the invention which are stated herein to not include additional modifying glycols may or may not contain minor amounts of diethylene glycol residues.

In any of the embodiments of the invention, the polyesters of the invention comprise 2,5-furandicarboxylic acid (FDCA) can optionally contain residues of terephthalic acid (TPA) and/or an ester thereof. Additional modifying dicarboxylic acid (or corresponding ester) residues (acids other than FDCA and TPA) can optionally be present.

In one embodiment, the polyesters of the invention can be used to manufacture articles including, but not limited to, injection molded articles, injection blow molded articles, injection stretch blow molded articles, extrusion blow molded articles, extrusion stretch blow molded articles, extrusion coatings, calendered articles, compression molded articles, and solution casted articles.

In one embodiment, the polyesters of the invention can be used to manufacture films, injection molded products, extrusion coatings, fibres, foams, thermoformed products, extruded profiles and sheets, extrusion blow molded articles, injection blow molded articles, rotomolded articles, stretch blow molded articles, etc.

Methods of making the articles of manufacuture, include, but are not limited to, extrusion blow molding, extrusion stretch blow molding, injection blow molding, injection stretch blow molding, calendering, rotomolding, compression molding, and solution casting.

In another embodiment, the invention further relates to articles of manufacture comprising the film(s) and/or sheet(s) containing polyester compositions described herein. In another embodiment, the invention relates to fibers. In yet another embodiment, the invention relates to foams and/or foamed articles. In another embodiment, this invention relates to thermoformed articles.

The methods of forming polyesters into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Examples of film or sheet production technologies include film blowing, casting (including solution casting), coextrusion, extrusion, calendering, and compression molding.

This invention relates to copolyester compositions based on 2,5-furandicarboxylic acid or an ester thereof and 1,4-cyclohexanedimethanol which are believed to provide greater stability with respect to glass transition temperature than would be expected by one of ordinary skill in the art.

BRIEF DESCRIPTION OF THE FIGURES

FIG. 1 is a graphical representation of Table 1 data and depicts glass transition temperature vs. mole percent CHDM for TPA-based and FDCA-based copolyesters.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

Copolyesters synthesized from 2,5-furandicarboxylic acid (FDCA) or its derivatives with 1,4-cyclohexanedimethanol (CHDM) have an advantage of nearly constant glass transition temperature (Tg) over a wide range of compositions, compared to commercial terephthalic acid-based copolyesters (PET, PETG, PCTG, PCT), for which Tg varies measurably as composition varies. This advantage may be beneficial for producing copolyesters with constant Tg even if composition varies during manufacturing.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds, for example, branching agents. Alternatively, a difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue. Thus, for example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment, furandicarboxylic acid and/or its ester may be used as a starting material. In yet another embodiment, mixtures of 2,5-furandicarboxylic acid and its ester may be used as the starting material and/or as an intermediate material.

Terephthalic acid and/or its ester may also be used in one embodiment as one of the starting materials, with 2,5-furandicarboxylic acid and/or its ester. In another embodiment, dimethyl terephthalate may be used instead of terephthalic acid as a starting material. In yet another embodiment, mixtures of terephthalic acid and dimethyl terephthalate may be used as starting materials and/or as an intermediate material.

Isophthalic acid and/or its ester may also be used in one embodiment as one of the starting materials, with 2,5-furandicarboxylic acid and/or its ester.

In another embodiment, terephthalic acid and/or its ester as well as isophthalic acid and/or its ester may also be used in combination as starting materials, with 2,5-furandicarboxylic acid and/or its ester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % 1,4-cyclohexanedimethanol, based on the total diol residues, means the polyester contains 30 mole 1,4-cyclohexanedimethanol residues out of a total of 100 mole % diol residues. Thus, there are 30 moles of 1,4-cyclohexanedimethanol residues among every 100 moles of diol residues.

In other aspects of the invention, the Tg of the polyesters useful in the invention can be at least one of the following ranges: 30 to 130° C.; 30 to 125° C.; 30 to 120° C.; 30 to 115° C.; 30 to 110° C.; 30 to 105° C.; 30 to 100° C.; 30 to 95° C.; 30 to 90° C.; 30 to 85° C.; 30 to 80° C.; 30 to 75° C.; 30 to 70° C.; 30 to 65° C.; 30 to 60° C.; 30 to 55° C.; 30 to 50° C.; 30 to 45° C.; 35 to 130° C.; 35 to 125° C.; 35 to 120° C.; 35 to 115° C.; 35 to 110° C.; 35 to 105° C.; 35 to 100° C.; 35 to 95° C.; 35 to 90° C.; 35 to 85° C.; 35 to 80° C.; 35 to 75° C.; 35 to 70° C.; 35 to 65° C.; 35 to 60° C.; 35 to 55° C.; 35 to 50° C.; 35 to 45° C.; 40 to 130° C.; 40 to 125° C.; 40 to 120° C.; 40 to 115° C.; 40 to 110° C.; 40 to 105° C.; 40 to 100° C.; 40 to 95° C.; 40 to 90° C.; 40 to 85° C.; 40 to 80° C.; 40 to 75° C.; 40 to 70° C.; 40 to 65° C.; 40 to 60° C.; 40 to 55° C.; 45 to 130° C.; 45 to 125° C.; 45 to 120° C.; 45 to 115° C.; 45 to 110° C.; 45 to 105° C.; 45 to 100° C.; 45 to 95° C.; 45 to 90° C.; 45 to 85° C.; 45 to 80° C.; 45 to 75° C.; 45 to 70° C.; 45 to 65° C.; 45 to 60° C.; 45 to 55° C.; 50 to 130° C.; 50 to 125° C.; 50 to 120° C.; 50 to 115° C.; 50 to 110° C.; 50 to 105° C.; 50 to 100° C.; 50 to 95° C.; 50 to 90° C.; 50 to 85° C.; 50 to 80° C.; 50 to 75° C.; 50 to 70° C.; 50 to 65° C.; 55 to 130° C.; 55 to 125° C.; 55 to 120° C.; 55 to 115° C.; 55 to 110° C.; 55 to 105° C.; 55 to 100° C.; 55 to 95° C.; 55 to 90° C.; 55 to 85° C.; 55 to 80° C.; 55 to 75° C.; 55 to 70° C.; 55 to 65° C.; 60 to 130° C.; 60 to 125° C.; 60 to 120° C.; 60 to 115° C.; 60 to 110° C.; 60 to 105° C.; 60 to 100° C.; 60 to 95° C.; 60 to 90° C.; 60 to 85° C.; 60 to 80° C.; 60 to 75° C.; 60 to 70° C.; 65 to 130° C.; 65 to 125° C.; 65 to 120° C.; 65 to 115° C.; 65 to 110° C.; 65 to 105° C.; 65 to 100° C.; 65 to 95° C.; 65 to 90° C.; 65 to 85° C.; 65 to 80° C.; 65 to 75° C.; 65 to 70° C.; 70 to 130° C.; 70 to 125° C.; 70 to 120° C.; 70 to 115° C.; 70 to 110° C.; 70 to 105° C.; 70 to 100° C.; 70 to 95° C.; 70 to 90° C.; 70 to 85° C.; 70 to 80° C.; 70 to 75° C.; 75 to 130° C.; 75 to 125° C.; 75 to 120° C.; 75 to 115° C.; 75 to 110° C.; 75 to 105° C.; 75 to 100° C.; 75 to 95° C.;

75 to 90° C.; 75 to 85° C.; 75 to 80° C.; 80 to 130° C.; 80 to 125° C.; 80 to 120° C.; 80 to 115° C.; 80 to 110° C.; 80 to 105° C.; 80 to 100° C.; 80 to 95° C.; 80 to 90° C.; 85 to 130° C.; 85 to 125° C.; 85 to 120° C.; 85 to 115° C.; 85 to 110° C.; 85 to 105° C.; 85 to 100° C.; 85 to 95° C.; 85 to 90° C.; 90 to 130° C.; 90 to 125° C.; 90 to 120° C.; 90 to 115° C.; 90 to 110° C.; 90 to 105° C.; 90 to 100° C.; 90 to 95° C.; 95 to 130° C.; 95 to 125° C.; 95 to 120° C.; 95 to 115° C.; 95 to 110° C.; 95 to 105° C.; 95 to 100° C.; 100 to 130° C.; 100 to 125° C.; 100 to 120° C.; 100 to 115° C.; or 100 to 110° C.

In other aspects of the invention, the glycol component for the polyesters useful in the film or sheet of the invention include but are not limited to at least one of the following ranges: 0.01 to 99 mole % 1,4-cyclohexanedimethanol and 1 to 99.99 mole % of at least one modifying glycol; 1 to 99 mole % 1,4-cyclohexanedimethanol and 1 to 99 mole % of at least one modifying glycol; 5 to 99 mole % 1,4-cyclohexanedimethanol and 1 to 95 mole % at least one modifying glycol; 10 to 99 mole % 1,4-cyclohexanedimethanol and 1 to 90 mole % of at least one modifying glycol; 15 to 99 mole % 1,4-cyclohexanedimethanol and 1 to 85 mole % of at least one modifying glycol; 20 to 99 mole % 1,4-cyclohexanedimethanol and 1 to 80 mole % of at least one modifying glycol; 25 to 99 mole % 1,4-cyclohexanedimethanol and 1 to 75 mole % of at least one modifying glycol; 30 to 99 mole % 1,4-cyclohexanedimethanol and 1 to 70 mole % of at least one modifying glycol; 35 to 99 mole % 1,4-cyclohexanedimethanol and 1 to 65 mole % of at least one modifying glycol; 40 to 99 mole % 1,4-cyclohexanedimethanol and 1 to 60 mole % of at least one modifying glycol; 45 to 99 mole % 1,4-cyclohexanedimethanol and 1 to 55 mole % of at least one modifying glycol; 50 to 99 mole % 1,4-cyclohexanedimethanol and 1 to 50 mole % of at least one modifying glycol; 55 to 99 mole % 1,4-cyclohexanedimethanol and 1 to 45 mole % of at least one modifying glycol; 60 to 99 mole % 1,4-cyclohexanedimethanol and 1 to 40 mole % of at least one modifying glycol; 65 to 99 mole % 1,4-cyclohexanedimethanol and 1 to 35 mole % of at least one modifying glycol; 70 to 99 mole % 1,4-cyclohexanedimethanol and 1 to 30 mole % of at least one modifying glycol; 75 to 99 mole % 1,4-cyclohexanedimethanol and 1 to 25 mole % of at least one modifying glycol; 80 to 99 mole % 1,4-cyclohexanedimethanol and 1 to 20 mole % of at least one modifying glycol; 85 to 99 mole % 1,4-cyclohexanedimethanol and 1 to 15 mole % of at least one modifying glycol; 90 to 99 mole % 1,4-cyclohexanedimethanol and 1 to 10 mole % of at least one modifying glycol.

In other aspects of the invention, the glycol component for the polyesters useful in the film or sheet of the invention include but are not limited to at least one of the following ranges: 0.01 to 95 mole % 1,4-cyclohexanedimethanol and 5 to 99.99 mole % of at least one modifying glycol; 1 to 95 mole % 1,4-cyclohexanedimethanol and 5 to 99 mole % of at least one modifying glycol; 5 to 95 mole % 1,4-cyclohexanedimethanol and 5 to 95 mole % of at least one modifying glycol; 10 to 95 mole % 1,4-cyclohexanedimethanol and 5 to 90 mole % of at least one modifying glycol; 15 to 95 mole % 1,4-cyclohexanedimethanol and 5 to 85 mole % of at least one modifying glycol; 20 to 95 mole % 1,4-cyclohexanedimethanol and 5 to 80 mole % of at least one modifying glycol; 25 to 95 mole % 1,4-cyclohexanedimethanol and 5 to 75 mole % of at least one modifying glycol; 30 to 95 mole % 1,4-cyclohexanedimethanol and 5 to 70 mole % of at least one modifying glycol; 35 to 95 mole % 1,4-cyclohexanedimethanol and 5 to 65 mole % of at least one modifying glycol; 40 to 95 mole % 1,4-cyclohexanedimethanol and 5 to 60 mole % of at least one modifying glycol; 45 to 95 mole % 1,4-cyclohexanedimethanol and 6 to 55 mole % of at least one modifying glycol; 50 to 95 mole % 1,4-cyclohexanedimethanol and 5 to 50 mole % of at least one modifying glycol; 55 to 95 mole % 1,4-cyclohexanedimethanol and 5 to 45 mole % of at least one modifying glycol; 60 to 95 mole % 1,4-cyclohexanedimethanol and 5 to 40 mole % of at least one modifying glycol; 65 to 95 mole % 1,4-cyclohexanedimethanol and 5 to 35 mole % of at least one modifying glycol; 70 to 95 mole % 1,4-cyclohexanedimethanol and 5 to 30 mole % of at least one modifying glycol; 75 to 95 mole % 1,4-cyclohexanedimethanol and 5 to 25 mole % of at least one modifying glycol; 80 to 95 mole % 1,4-cyclohexanedimethanol and 5 to 20 mole % of at least one modifying glycol; 85 to 95 mole % 1,4-cyclohexanedimethanol and 5 to 15 mole % of at least one modifying glycol; 90 to 95 mole % 1,4-cyclohexanedimethanol and 5 to 10 mole % of at least one modifying glycol.

In other aspects of the invention, the glycol component for the polyesters useful in the film or sheet of the invention include but are not limited to at least one of the following ranges: 0.01 to 90 mole % 1,4-cyclohexanedimethanol and 10 to 99.99 mole % of at least one modifying glycol; 1 to 90 mole % 1,4-cyclohexanedimethanol and 10 to 99 mole % of at least one modifying glycol; 5 to 90 mole % 1,4-cyclohexanedimethanol and 10 to 95 mole % of at least one modifying glycol; 10 to 90 mole % 1,4-cyclohexanedimethanol and 10 to 90 mole % of at least one modifying glycol; 15 to 90 mole % 1,4-cyclohexanedimethanol and 10 to 85 mole % of at least one modifying glycol; 20 to 90 mole % 1,4-cyclohexanedimethanol and 10 to 80 mole % of at least one modifying glycol, 25 to 90 mole % 1,4-cyclohexanedimethanol and 10 to 75 mole % of at least one modifying glycol; 30 to 90 mole % 1,4-cyclohexanedimethanol and 10 to 70 mole % of at least one modifying glycol; 35 to 90 mole % 1,4-cyclohexanedimethanol and 10 to 65 mole % of at least one modifying glycol; 40 to 90 mole % 1,4-cyclohexanedimethanol and 10 to 60 mole % of at least one modifying glycol; 45 to 90 mole % 1,4-cyclohexanedimethanol and 10 to 55 mole % of at least one modifying glycol; 50 to 90 mole % 1,4-cyclohexanedimethanol and 10 to 50 mole % of at least one modifying glycol.

In other aspects of the invention, the glycol component for the polyesters useful in the invention include but are not limited to at least one of the following ranges: 55 to 90 mole % 1,4-cyclohexanedimethanol and 10 to 45 mole % of at least one modifying glycol; 60 to 90 mole % 1,4-cyclohexanedimethanol and 10 to 40 mole % of at least one modifying glycol; 65 to 90 mole % 1,4-cyclohexanedimethanol and 10 to 35 mole % of at least one modifying glycol; 70 to 90 mole % 1,4-cyclohexanedimethanol and 10 to 30 mole % of at least one modifying glycol; 75 to 90 mole % 1,4-cyclohexanedimethanol and 10 to 25 mole % of at least one modifying glycol; 80 to 90 mole % 1,4-cyclohexanedimethanol and 10 to 20 mole % of at least one modifying glycol; 85 to 90 mole % 1,4-cyclohexanedimethanol and 10 to 15 mole % of at least one modifying glycol.

In other aspects of the invention, the glycol component for the polyesters useful in the invention include but are not limited to at least one of the following ranges: 0.01 to 85 mole % 1,4-cyclohexanedimethanol and 15 to 99.99 mole % of at least one modifying glycol; 1 to 85 mole % 1,4-cyclohexanedimethanol and 15 to 99 mole % of at least one modifying glycol; 5 to 85 mole % 1,4-cyclohexanedimethanol and 15 to 95 mole % of at least one modifying glycol; 10 to 85 mole % 1,4-cyclohexanedimethanol and 15 to 90 mole % of at least one modifying glycol; 15 to 85 mole % 1,4-cyclohexanedimethanol and 15 to 85 mole % of at least one modifying glycol; 20 to 85 mole % 1,4-cyclohexanedimethanol and 15 to 80 mole % of at least one modifying glycol; 25 to 85 mole % 1,4-cyclohexanedimethanol and 15 to 75 mole % of at least one modifying glycol; 30 to 85 mole % 1,4-cyclohexanedimethanol and 15 to 70 mole % of at least one modifying glycol; 35 to 85 mole % 1,4-cyclohexanedimethanol and 15 to 65 mole % of at least one modifying glycol; 40 to 85 mole % 1,4-cyclohexanedimethanol and 15 to 60 mole % of at least one modifying glycol; 45 to 85 mole % 1,4-cyclohexanedimethanol 15 to 55 mole % of at least one modifying glycol; 50 to 85 mole % 1,4-cyclohexanedimethanol and 15 to 50 mole % of at least one modifying glycol.

In other aspects of the invention, the glycol component for the polyesters useful in the invention include but are not limited to at least one of the following ranges: 55 to 85 mole % 1,4-cyclohexanedimethanol and 15 to 45 mole % of at least one modifying glycol; 60 to 85 mole % 1,4-cyclohexanedimethanol and 15 to 40 mole % of at least one modifying glycol; 65 to 85 mole % 1,4-cyclohexanedimethanol and 15 to 35 mole % of at least one modifying glycol; 70 to 85 mole % 1,4-cyclohexanedimethanol and 15 to 30 mole % of at least one modifying glycol; 75 to 85 mole % 1,4-cyclohexanedimethanol and 15 to 25 mole % of at least one modifying glycol; 80 to 85 mole % 1,4-cyclohexanedimethanol and 15 to 20 mole % of at least one modifying glycol.

In other aspects of the invention, the glycol component for the polyesters useful in the invention include but are not limited to at least one of the following ranges: 0.01 to 80 mole % 1,4-cyclohexanedimethanol and 20 to 99.99 mole % of at least one modifying glycol; 1 to 80 mole % 1,4-cyclohexanedimethanol and 20 to 99 mole % of at least one modifying glycol; 5 to 80 mole % 1,4-cyclohexanedimethanol and 20 to 95 mole % of at least one modifying glycol; 10 to 80 mole % 1,4-cyclohexanedimethanol and 20 to 90 mole % of at least one modifying glycol; 15 to 80 mole % 1,4-cyclohexanedimethanol and 20 to 85 mole % of at least one modifying glycol; 20 to 80 mole % 1,4-cyclohexanedimethanol and 20 to 80 mole % of at least one modifying glycol; 25 to 80 mole % 1,4-cyclohexanedimethanol and 20 to 75 mole % of at least one modifying glycol; 30 to 80 mole % 1,4-cyclohexanedimethanol and 20 to 70 mole % of at least one modifying glycol; 35 to 80 mole % 1,4-cyclohexanedimethanol and 20 to 65 mole % of at least one modifying glycol; 40 to 80 mole % 1,4-cyclohexanedimethanol and 20 to 60 mole % of at least one modifying glycol; 45 to 80 mole % 1,4-cyclohexanedimethanol and 20 to 55 mole % of at least one modifying glycol; 50 to 80 mole % 1,4-cyclohexanedimethanol and 20 to 50 mole % of at least one modifying glycol; 55 to 80 mole % 1,4-cyclohexanedimethanol and 20 to 45 mole % of at least one modifying glycol; 60 to 80 mole % 1,4-cyclohexanedimethanol and 20 to 40 mole % of at least one modifying glycol; 65 to 80 mole % 1,4-cyclohexanedimethanol and 20 to 35 mole % of at least one modifying glycol; 70 to 80 mole % 1,4-cyclohexanedimethanol and 20 to 30 mole % of at least one modifying glycol; and 75 to 80 mole % 1,4-cyclohexanedimethanol and 20 to 25 mole % of at least one modifying glycol.

In other aspects of the invention, the glycol component for the polyesters useful in the invention include but are not limited to at least one of the following ranges: 0.01 to 75 mole % 1,4-cyclohexanedimethanol and 25 to 99.99 mole % of at least one modifying glycol; 1 to 75 mole % 1,4-cyclohexanedimethanol and 25 to 99 mole % of at least one modifying glycol; to 75 mole % 1,4-cyclohexanedimethanol and 25 to 95 mole % of at least one modifying glycol; 10 to 75 mole % 1,4-cyclohexanedimethanol and 25 to 90 mole % of at least one modifying glycol; 15 to 75 mole % 1,4-cyclohexanedimethanol and 25 to 85 mole % of at least one modifying glycol; 20 to 75 mole % 1,4-cyclohexanedimethanol and 25 to 80 mole % of at least one modifying glycol; 25 to 75 mole % 1,4-cyclohexanedimethanol and 25 to 75 mole % of at least one modifying glycol; 30 to 75 mole % 1,4-cyclohexanedimethanol and 25 to 70 mole % of at least one modifying glycol; 35 to 75 mole % 1,4-cyclohexanedimethanol and 25 to 65 mole % of at least one modifying glycol; 40 to 75 mole % 1,4-cyclohexanedimethanol and 25 to 60 mole % of at least one modifying glycol; 45 to 75 mole % 1,4-cyclohexanedimethanol and 25 to 55 mole % of at least one modifying glycol; 50 to 75 mole % 1,4-cyclohexanedimethanol and 25 to 50 mole % of at least one modifying glycol; 55 to 75 mole % 1,4-cyclohexanedimethanol and 25 to 45 mole % of at least one modifying glycol; 60 to 75 mole % 1,4-cyclohexanedimethanol and 25 to 40 mole % of at least one modifying glycol; 65 to 75 mole % 1,4-cyclohexanedimethanol and 25 to 35 mole % of at least one modifying glycol; and 70 to 75 mole % 1,4-cyclohexanedimethanol and 25 to 30 mole % of at least one modifying glycol.

In other aspects of the invention, the glycol component for the polyesters useful in the invention include but are not limited to at least one of the following ranges: 0.01 to 65 mole % 1,4-cyclohexanedimethanol and 35 to 99.99 mole % of at least one modifying glycol; 1 to 65 mole % 1,4-cyclohexanedimethanol and 35 to 99 mole % of at least one modifying glycol; 5 to 65 mole % 1,4-cyclohexanedimethanol and 35 to 95 mole % of at least one modifying glycol; 10 to 65 mole % 1,4-cyclohexanedimethanol and 35 to 90 mole % of at least one modifying glycol; 15 to 65 mole % 1,4-cyclohexanedimethanol and 35 to 85 mole % of at least one modifying glycol; 20 to 65 mole % 1,4-cyclohexanedimethanol and 35 to 80 mole % of at least one modifying glycol, 25 to 65 mole % 1,4-cyclohexanedimethanol and 35 to 75 mole % of at least one modifying glycol; 30 to 65 mole % 1,4-cyclohexanedimethanol and 35 to 70 mole % of at least one modifying glycol; 35 to 65 mole % 1,4-cyclohexanedimethanol and 35 to 65 mole % of at least one modifying glycol; 40 to 65 mole % 1,4-cyclohexanedimethanol and 35 to 60 mole % of at least one modifying glycol; 45 to 65 mole % 1,4-cyclohexanedimethanol and 35 to 55 mole % of at least one modifying glycol; 50 to 65 mole % 1,4-cyclohexanedimethanol and 35 to 50 mole % of at least one modifying glycol; 55 to 65 mole % 1,4-cyclohexanedimethanol and 35 to 45 mole % of at least one modifying glycol; and 60 to 65 mole % 1,4-cyclohexanedimethanol and 35 to 40 mole % of at least one modifying glycol.

In other aspects of the invention, the glycol component for the polyesters useful in the invention include but are not limited to at least one of the following ranges: 0.01 to 60 mole % 1,4-cyclohexanedimethanol and 40 to 99.99 mole % of at least one modifying glycol; 1 to 60 mole % 1,4-cyclohexanedimethanol and 40 to 99 mole % of at least one modifying glycol; 5 to 60 mole % 1,4-cyclohexanedimethanol and 40 to 95 mole % of at least one modifying glycol; 10 to 60 mole % 1,4-cyclohexanedimethanol and 40 to 90 mole % of at least one modifying glycol; 15 to 60 mole % 1,4-cyclohexanedimethanol and 40 to 85 mole % of at least one modifying glycol; 20 to 60 mole % 1,4-cyclohexanedimethanol and 40 to 80 mole % of at least one modifying glycol; 25 to 60 mole % 1,4-cyclohexanedimethanol and 40 to 75 mole % of at least one modifying glycol; 30 to 60 mole % 1,4-cyclohexanedimethanol and 40 to 70 mole % of at least one modifying glycol; 35 to 60 mole % 1,4-cyclohexanedimethanol and 40 to 65 mole % of at least one modifying glycol; 40 to 60 mole % 1,4-cyclohexanedimethanol and 40 to 60 mole % of at least one modifying glycol; 45 to 60 mole % 1,4-cyclohexanedimethanol and 40 to 55 mole % of at least one modifying glycol; 50 to 60 mole % 1,4-cyclohexanedimethanol and 40 to 50 mole % of at least one modifying glycol; 55 to 60 mole % 1,4-cyclohexanedimethanol and 40 to 45 mole % of at least one modifying glycol.

In other aspects of the invention, the glycol component for the polyesters useful in the invention include but are not limited to at least one of the following ranges: 0.01 to 55 mole % 1,4-cyclohexanedimethanol and 45 to 99.99 mole % of at least one modifying glycol; 1 to 55 mole % 1,4-cyclohexanedimethanol and 45 to 99 mole % of at least one modifying glycol; 5 to 55 mole % 1,4-cyclohexanedimethanol and 45 to 95 mole % of at least one modifying glycol; 10 to 55 mole % 1,4-cyclohexanedimethanol and 45 to 90 mole % of at least one modifying glycol; 15 to 55 mole % 1,4-cyclohexanedimethanol and 45 to 85 mole % of at least one modifying glycol; 20 to 55 mole % 1,4-cyclohexanedimethanol and 45 to 80 mole % of at least one modifying glycol; 25 to 55 mole % 1,4-cyclohexanedimethanol and 45 to 75 mole % of at least one modifying glycol; 30 to 55 mole % 1,4-cyclohexanedimethanol and 45 to 70 mole % of at least one modifying glycol; 35 to 55 mole % 1,4-cyclohexanedimethanol and 45 to 65 mole % of at least one modifying glycol; 40 to 55 mole % 1,4-cyclohexanedimethanol and 45 to 60 mole % of at least one modifying glycol; 45 to 55 mole % 1,4-cyclohexanedimethanol and 45 to 55 mole % of at least one modifying glycol; and 50 to 55 mole % 1,4-cyclohexanedimethanol and 45 to 50 mole % of at least one modifying glycol.

In other aspects of the invention, the glycol component for the polyesters useful in the invention include but are not limited to at least one of the following ranges: 0.01 to 50 mole % 1,4-cyclohexanedimethanol and 50 to 99.99 mole % of at least one modifying glycol; 1 to 50 mole % 1,4-cyclohexanedimethanol and 50 to 99 mole % of at least one modifying glycol; 5 to 50 mole % 1,4-cyclohexanedimethanol and 50 to 95 mole % of at least one modifying glycol; 10 to 50 mole % 1,4-cyclohexanedimethanol and 50 to 90 mole % of at least one modifying glycol; 15 to 50 mole % 1,4-cyclohexanedimethanol and 50 to 85 mole % of at least one modifying glycol; 20 to 50 mole % 1,4-cyclohexanedimethanol and 50 to 80 mole % of at least one modifying glycol 25 to 50 mole % 1,4-cyclohexanedimethanol and 50 to 75 mole % of at least one modifying glycol; 30 to 50 mole % 1,4-cyclohexanedimethanol and 50 to 70 mole % of at least one modifying glycol; 35 to 50 mole % 1,4-cyclohexanedimethanol and 50 to 65 mole % of at least one modifying glycol; 40 to 50 mole % 1,4-cyclohexanedimethanol and 50 to 60 mole % of at least one modifying glycol; and 45 to 50 mole % 1,4-cyclohexanedimethanol and 50 to 55 mole % of at least one modifying glycol.

In other aspects of the invention, the glycol component for the polyesters useful in the invention include but are not limited to at least one of the following ranges: 0.01 to 45 mole % 1,4-cyclohexanedimethanol and 55 to 99.99 mole % of at least one modifying glycol; 1 to 45 mole % 1,4-cyclohexanedimethanol and 55 to 99 mole % of at least one modifying glycol; 5 to 45 mole % 1,4-cyclohexanedimethanol and 50 to 95 mole % of at least one modifying glycol; 10 to 45 and 55 to 95 mole % of at least one modifying glycol mole % 1,4-cyclohexanedimethanol; 15 to 45 mole % 1,4-cyclohexanedimethanol and 55 to 85 mole % of at least one modifying glycol; 20 to 45 mole % 1,4-cyclohexanedimethanol and 55 to 80 mole % of at least one modifying glycol; 25 to 45 mole % 1,4-cyclohexanedimethanol and 55 to 75 mole % of at least one modifying glycol; 30 to 45 mole % 1,4-cyclohexanedimethanol and 55 to 65 mole % of at least one modifying glycol; 35 to 45 mole % 1,4-cyclohexanedimethanol and 55 to 65 mole % of at least one modifying glycol; 40 to 45 mole % 1,4-cyclohexanedimethanol and 55 to 60 mole % of at least one modifying glycol.

In other aspects of the invention, the glycol component for the polyesters useful in the invention include but are not limited to at least one of the following ranges: 0.01 to 40 mole % 1,4-cyclohexanedimethanol and 60 to 99.99 mole % of at least one modifying glycol; 1 to 40 mole % 1,4-cyclohexanedimethanol and 60 to 99 mole % of at least one modifying glycol; 5 to 40 mole % 1,4-cyclohexanedimethanol and 60 to 95 mole % of at least one modifying glycol; 10 to 40 mole % 1,4-cyclohexanedimethanol and 60 to 90 mole % of at least one modifying glycol; 15 to 40 mole % 1,4-cyclohexanedimethanol and 60 to 85 mole % of at least one modifying glycol; 20 to 40 mole % 1,4-cyclohexanedimethanol and 60 to 80 mole % of at least one modifying glycol; 25 to 40 mole % 1,4-cyclohexanedimethanol and 60 to 75 mole % of at least one modifying glycol; 30 to 40 mole % 1,4-cyclohexanedimethanol and 60 to 70 mole % of at least one modifying glycol; 35 to 40 mole % 1,4-cyclohexanedimethanol and 60 to 65 mole % of at least one modifying glycol.

In other aspects of the invention, the glycol component for the polyesters useful in the invention include but are not limited to at least one of the following ranges: 0.01 to 35 mole % 1,4-cyclohexanedimethanol and 65 to 99.99 mole % of at least one modifying glycol; 1 to 35 mole % 1,4-cyclohexanedimethanol and 65 to 99 mole % of at least one modifying glycol; 5 to 35 mole % 1,4-cyclohexanedimethanol and 65 to 95 mole % of at least one modifying glycol; 10 to 35 mole % 1,4-cyclohexanedimethanol and 65 to 90 mole % of at least one modifying glycol; 15 to 35 mole % 1,4-cyclohexanedimethanol and 65 to 85 mole % of at least one modifying glycol; 20 to 35 mole % 1,4-cyclohexanedimethanol and 65 to 80 mole % of at least one modifying glycol; 25 to 35 mole % 1,4-cyclohexanedimethanol and 65 to 75 mole % of at least one modifying glycol; 30 to 35 mole % 1,4-cyclohexanedimethanol and 65 to 70 mole % of at least one modifying glycol.

In other aspects of the invention, the glycol component for the polyesters useful in the invention include but are not limited to at least one of the following ranges: 0.01 to 30 mole % 1,4-cyclohexanedimethanol and 70 to 99.99 mole % mole % of at least one modifying glycol; 1 to 30 mole % 1,4-cyclohexanedimethanol and 70 to 99 mole % of at least one modifying glycol; 5 to 30 mole % 1,4-cyclohexanedimethanol and 70 to 95 mole % of at least one modifying glycol; 10 to 30 mole % 1,4-cyclohexanedimethanol and 70 to 90 mole % of at least one modifying glycol; 15 to 30 mole % 1,4-cyclohexanedimethanol and 70 to 85 mole % of at least one modifying glycol; 20 to 30 mole % 1,4-cyclohexanedimethanol and 70 to 80 mole % of at least one modifying glycol; 25 to 30 mole % 1,4-cyclohexanedimethanol and 70 to 75 mole % of at least one modifying glycol.

In other aspects of the invention, the glycol component for the polyesters useful in the invention include but are not limited to at least one of the following ranges: 0.01 to 25 mole % 1,4-cyclohexanedimethanol and 75 to 99.99 mole % of at least one modifying glycol; 1 to 25 mole % 1,4-cyclohexanedimethanol and 75 to 99 mole % of at least one modifying glycol; 5 to 25 mole % 1,4-cyclohexanedimethanol and 75 to 95 mole % of at least one modifying glycol; 10 to 25 mole % 1,4-cyclohexanedimethanol and 75 to 90 mole % of at least one modifying glycol; 15 to 25 mole % 1,4-cyclohexanedimethanol and 75 to 85 mole % of at least one modifying glycol; 20 to 25 mole % 1,4-cyclohexanedimethanol and 75 to 80 mole % of at least one modifying glycol.

In other aspects of the invention, the glycol component for the polyesters useful in the invention include but are not limited to at least one of the following ranges: 0.01 to 20 mole % 1,4-cyclohexanedimethanol and 80 to 99.99 mole % of at least one modifying glycol; 1 to 20 mole % 1,4-cyclohexanedimethanol and 80 to 99 mole % of at least one modifying glycol; 5 to 20 mole % 1,4-cyclohexanedimethanol and 80 to 95 mole % of at least one modifying glycol; 10 to 20 mole % 1,4-cyclohexanedimethanol and 80 to 90 mole % of at least one modifying glycol; and 15 to 20 mole % 1,4-cyclohexanedimethanol and 80 to 85 mole % of at least one modifying glycol.

In other aspects of the invention, the glycol component for the polyesters useful in the invention include but are not limited to at least one of the following ranges: 0.01 to 15 mole % 1,4-cyclohexanedimethanol and 85 to 99.99 mole % of at least one modifying glycol; 1 to 15 mole % 1,4-cyclohexanedimethanol and 85 to 99 mole % of at least one modifying glycol; 5 to 15 mole % 1,4-cyclohexanedimethanol and 85 to 95 mole % of at least one modifying glycol; and 10 to 15 mole % 1,4-cyclohexanedimethanol and 85 to 90 mole % of at least one modifying glycol.

In other aspects of the invention, the glycol component for the polyesters useful in the invention include but are not limited to at least one of the following ranges: 0.01 to 10 mole % 1,4-cyclohexanedimethanol and 90 to 99.99 mole % of at least one modifying glycol; 1 to 10 mole % 1,4-cyclohexanedimethanol and 90 to 99 mole % of at least one modifying glycol; 5 to 10 mole % 1,4-cyclohexanedimethanol and 90 to 95 mole % of at least one modifying glycol; 0.01 to 5 mole % 1,4-cyclohexanedimethanol and 95 to 99.99 mole % of at least one modifying glycol and 1 to 5 mole % 1,4-cyclohexanedimethanol and 95 to 99 mole % of at least one modifying glycol.

In other aspects of the invention, the glycol component for the polyesters useful in the film or sheet of the invention include but are not limited to at least one of the following ranges: 0.01 to 99 mole % 1,4-cyclohexanedimethanol and 1 to 99.99 mole % ethylene glycol; 1 to 99 mole % 1,4-cyclohexanedimethanol and 1 to 99 mole % ethylene glycol; 5 to 99 mole % 1,4-cyclohexanedimethanol and 1 to 95 mole % ethylene glycol; 10 to 99 mole % 1,4-cyclohexanedimethanol and 1 to 90 mole % ethylene glycol; 15 to 99 mole % 1,4-cyclohexanedimethanol and 1 to 85 mole % ethylene glycol; 20 to 99 mole % 1,4-cyclohexanedimethanol and 1 to 80 mole % ethylene glycol; 25 to 99 mole % 1,4-cyclohexanedimethanol and 1 to 75 mole % ethylene glycol; 30 to 99 mole % 1,4-cyclohexanedimethanol and 1 to 70 mole % ethylene glycol; 35 to 99 mole % 1,4-cyclohexanedimethanol and 1 to 65 mole % ethylene glycol; 40 to 99 mole % 1,4-cyclohexanedimethanol and 1 to 60 mole % ethylene glycol; 45 to 99 mole 1,4-cyclohexanedimethanol and 1 to 55 mole % ethylene glycol; 50 to 99 mole % 1,4-cyclohexanedimethanol and 1 to 50 mole % ethylene glycol; 55 to 99 mole % 1,4-cyclohexanedimethanol and 1 to 45 mole % ethylene glycol; 60 to 99 mole % 1,4-cyclohexanedimethanol and 1 to 40 mole % ethylene glycol; 65 to 99 mole % 1,4-cyclohexanedimethanol and 1 to 35 mole % ethylene glycol; 70 to 99 mole % 1,4-cyclohexanedimethanol and 1 to 30 mole ethylene glycol; 75 to 99 mole % 1,4-cyclohexanedimethanol and 1 to 25 mole % ethylene glycol; 80 to 99 mole % 1,4-cyclohexanedimethanol and 1 to 20 mole % ethylene glycol; 85 to 99 mole % 1,4-cyclohexanedimethanol and 1 to 15 mole % ethylene glycol; 90 to 99 mole % 1,4-cyclohexanedimethanol and 1 to 10 mole % ethylene glycol.

In other aspects of the invention, the glycol component for the polyesters useful in the film or sheet of the invention include but are not limited to at least one of the following ranges: 0.01 to 95 mole % 1,4-cyclohexanedimethanol and 5 to 99.99 mole % ethylene glycol; 1 to 95 mole % 1,4-cyclohexanedimethanol and 5 to 99 mole % ethylene glycol; 5 to 95 mole % 1,4-cyclohexanedimethanol and 5 to 95 mole % ethylene glycol; 10 to 95 mole % 1,4-cyclohexanedimethanol and 5 to 90 mole % ethylene glycol; 15 to 95 mole % 1,4-cyclohexanedimethanol and 5 to 85 mole % ethylene glycol; 20 to 95 mole % 1,4-cyclohexanedimethanol and 5 to 80 mole % ethylene glycol; 25 to 95 mole % 1,4-cyclohexanedimethanol and 5 to 75 mole % ethylene glycol; 30 to 95 mole % 1,4-cyclohexanedimethanol and 5 to 70 mole % ethylene glycol; 35 to 95 mole % 1,4-cyclohexanedimethanol and 5 to 65 mole % ethylene glycol; 40 to 95 mole % 1,4-cyclohexanedimethanol and 5 to 60 mole % ethylene glycol; 45 to 95 mole % 1,4-cyclohexanedimethanol and 6 to 55 mole % ethylene glycol; 50 to 95 mole % 1,4-cyclohexanedimethanol and 5 to 50 mole % ethylene glycol; 55 to 95 mole % 1,4-cyclohexanedimethanol and 5 to 45 mole % ethylene glycol; 60 to 95 mole % 1,4-cyclohexanedimethanol and 5 to 40 mole % ethylene glycol; 65 to 95 mole % 1,4-cyclohexanedimethanol and 5 to 35 mole % ethylene glycol; 70 to 95 mole % 1,4-cyclohexanedimethanol and 5 to 30 mole % ethylene glycol; 75 to 95 mole % 1,4-cyclohexanedimethanol and 5 to 25 mole % ethylene glycol; 80 to 95 mole % 1,4-cyclohexanedimethanol and 5 to 20 mole % ethylene glycol; 85 to 95 mole % 1,4-cyclohexanedimethanol and 5 to 15 mole % ethylene glycol; 90 to 95 mole % 1,4-cyclohexanedimethanol and 5 to 10 mole % ethylene glycol.

In other aspects of the invention, the glycol component for the polyesters useful in the film or sheet of the invention include but are not limited to at least one of the following ranges: 0.01 to 90 mole % 1,4-cyclohexanedimethanol and 10 to 99.99 mole % ethylene glycol; 1 to 90 mole % 1,4-cyclohexanedimethanol and 10 to 99 mole % ethylene glycol; 5 to 90 mole % 1,4-cyclohexanedimethanol and 10 to 95 mole % ethylene glycol; 10 to 90 mole % 1,4-cyclohexanedimethanol and 10 to 90 mole % ethylene glycol; 15 to 90 mole % 1,4-cyclohexanedimethanol and 10 to 85 mole ethylene glycol; 20 to 90 mole % 1,4-cyclohexanedimethanol and 10 to 80 mole % ethylene glycol, 25 to 90 mole % 1,4-cyclohexanedimethanol and 10 to 75 mole % ethylene glycol; 30 to 90 mole % 1,4-cyclohexanedimethanol and 10 to 70 mole % ethylene glycol; 35 to 90 mole % 1,4-cyclohexanedimethanol and 10 to 65 mole % ethylene glycol; 40 to 90 mole % 1,4-cyclohexanedimethanol and 10 to 60 mole % ethylene glycol; 45 to 90 mole % 1,4-cyclohexanedimethanol and 10 to 55 mole % ethylene glycol; 50 to 90 mole % 1,4-cyclohexanedimethanol and 10 to 50 mole % ethylene glycol.

In other aspects of the invention, the glycol component for the polyesters useful in the invention include but are not limited to at least one of the following ranges: 55 to 90 mole % 1,4-cyclohexanedimethanol and 10 to 45 mole % ethylene glycol; 60 to 90 mole % 1,4-cyclohexanedimethanol and 10 to 40 mole % ethylene glycol; 65 to 90 mole % 1,4-cyclohexanedimethanol and 10 to 35 mole % ethylene glycol; 70 to 90 mole % 1,4-cyclohexanedimethanol and 10 to 30 mole % ethylene glycol; 75 to 90 mole % 1,4-cyclohexanedimethanol and 10 to 25 mole % ethylene glycol; 80 to 90 mole % 1,4-cyclohexanedimethanol and 10 to 20 mole % ethylene glycol; 85 to 90 mole % 1,4-cyclohexanedimethanol and 10 to 15 mole ethylene glycol.

In other aspects of the invention, the glycol component for the polyesters useful in the invention include but are not limited to at least one of the following ranges: 0.01 to 85 mole % 1,4-cyclohexanedimethanol and 15 to 99.99 mole % ethylene glycol; 1 to 85 mole % 1,4-cyclohexanedimethanol and 15 to 99 mole % ethylene glycol; 5 to 85 mole % 1,4-cyclohexanedimethanol and 15 to 95 mole % ethylene glycol; 10 to 85 mole % 1,4-cyclohexanedimethanol and 15 to 90 mole % ethylene glycol; 15 to 85 mole % 1,4-cyclohexanedimethanol and 15 to 85 mole % ethylene glycol; 20 to 85 mole % 1,4-cyclohexanedimethanol and 15 to 80 mole % ethylene glycol; 25 to 85 mole % 1,4-cyclohexanedimethanol and 15 to 75 mole % ethylene glycol; 30 to 85 mole % 1,4-cyclohexanedimethanol and 15 to 70 mole % ethylene glycol; 35 to 85 mole % 1,4-cyclohexanedimethanol and 15 to 65 mole % ethylene glycol; 40 to 85 mole % 1,4-cyclohexanedimethanol and 15 to 60 mole % ethylene glycol; 45 to 85 mole % 1,4-cyclohexanedimethanol 15 to 55 mole % ethylene glycol; 50 to 85 mole % 1,4-cyclohexanedimethanol and 15 to 50 mole % ethylene glycol.

In other aspects of the invention, the glycol component for the polyesters useful in the invention include but are not limited to at least one of the following ranges: 55 to 85 mole % 1,4-cyclohexanedimethanol and 15 to 45 mole % ethylene glycol; 60 to 85 mole % 1,4-cyclohexanedimethanol and 15 to 40 mole % ethylene glycol; 65 to 85 mole % 1,4-cyclohexanedimethanol and 15 to 35 mole % ethylene glycol; 70 to 85 mole % 1,4-cyclohexanedimethanol and 15 to 30 mole % ethylene glycol; 75 to 85 mole % 1,4-cyclohexanedimethanol and 15 to 25 mole % ethylene glycol; 80 to 85 mole % 1,4-cyclohexanedimethanol and 15 to 20 mole % ethylene glycol.

In other aspects of the invention, the glycol component for the polyesters useful in the invention include but are not limited to at least one of the following ranges: 0.01 to 80 mole % 1,4-cyclohexanedimethanol and 20 to 99.99 mole % ethylene glycol; 1 to 80 mole % 1,4-cyclohexanedimethanol and 20 to 99 mole % ethylene glycol; 5 to 80 mole % 1,4-cyclohexanedimethanol and 20 to 95 mole % ethylene glycol; 10 to 80 mole % 1,4-cyclohexanedimethanol and 20 to 90 mole % ethylene glycol; 15 to 80 mole % 1,4-cyclohexanedimethanol and 20 to 85 mole % ethylene glycol; 20 to 80 mole % 1,4-cyclohexanedimethanol and 20 to 80 mole % ethylene glycol; 25 to 80 mole % 1,4-cyclohexanedimethanol and 20 to 75 mole % ethylene glycol; 30 to 80 mole % 1,4-cyclohexanedimethanol and 20 to 70 mole % ethylene glycol; 35 to 80 mole % 1,4-cyclohexanedimethanol and 20 to 65 mole % ethylene glycol; 40 to 80 mole % 1,4-cyclohexanedimethanol and 20 to 60 mole % ethylene glycol; 45 to 80 mole % 1,4-cyclohexanedimethanol and 20 to 55 mole % ethylene glycol; 50 to 80 mole % 1,4-cyclohexanedimethanol and 20 to 50 mole % ethylene glycol; 55 to 80 mole % 1,4-cyclohexanedimethanol and 20 to 45 mole % ethylene glycol; 60 to 80 mole % 1,4-cyclohexanedimethanol and 20 to 40 mole % ethylene glycol; 65 to 80 mole % 1,4-cyclohexanedimethanol and 20 to 35 mole % ethylene glycol; 70 to 80 mole % 1,4-cyclohexanedimethanol and 20 to 30 mole % ethylene glycol; and 75 to 80 mole % 1,4-cyclohexanedimethanol and 20 to 25 mole % ethylene glycol.

In other aspects of the invention, the glycol component for the polyesters useful in the invention include but are not limited to at least one of the following ranges: 0.01 to 75 mole % 1,4-cyclohexanedimethanol and 25 to 99.99 mole % ethylene glycol; 1 to 75 mole % 1,4-cyclohexanedimethanol and 25 to 99 mole % ethylene glycol; 5 to 75 mole % 1,4-cyclohexanedimethanol and 25 to 95 mole % ethylene glycol; 10 to 75 mole % 1,4-cyclohexanedimethanol and 25 to 90 mole % ethylene glycol; 15 to 75 mole % 1,4-cyclohexanedimethanol and 25 to 85 mole % ethylene glycol; 20 to 75 mole % 1,4-cyclohexanedimethanol and 25 to 80 mole % ethylene glycol; 25 to 75 mole % 1,4-cyclohexanedimethanol and 25 to 75 mole % ethylene glycol; 30 to 75 mole % 1,4-cyclohexanedimethanol and 25 to 70 mole % ethylene glycol; 35 to 75 mole % 1,4-cyclohexanedimethanol and 25 to 65 mole % ethylene glycol; 40 to 75 mole % 1,4-cyclohexanedimethanol and 25 to 60 mole % ethylene glycol; 45 to 75 mole % 1,4-cyclohexanedimethanol and 25 to 55 mole % ethylene glycol; 50 to 75 mole % 1,4-cyclohexanedimethanol and 25 to 50 mole % ethylene glycol; 55 to 75 mole % 1,4-cyclohexanedimethanol and 25 to 45 mole % ethylene glycol; 60 to 75 mole % 1,4-cyclohexanedimethanol and 25 to 40 mole % ethylene glycol; 65 to 75 mole % 1,4-cyclohexanedimethanol and 25 to 35 mole % ethylene glycol; and 70 to 75 mole % 1,4-cyclohexanedimethanol and 25 to 30 mole % ethylene glycol.

In other aspects of the invention, the glycol component for the polyesters useful in the invention include but are not limited to at least one of the following ranges: 0.01 to 70 mole % 1,4-cyclohexanedimethanol and 30 to 99.99 mole % ethylene glycol; 1 to 70 mole % 1,4-cyclohexanedimethanol and 30 to 99 mole % ethylene glycol; 5 to 70 mole % 1,4-cyclohexanedimethanol and 30 to 95 mole % ethylene glycol; 10 to 70 mole 1,4-cyclohexanedimethanol and 30 to 90 mole % ethylene glycol; 15 to 70 mole % 1,4-cyclohexanedimethanol and 30 to 85 mole % ethylene glycol; 20 to 70 mole % 1,4-cyclohexanedimethanol and 30 to 80 mole % ethylene glycol; 25 to 70 mole % 1,4-cyclohexanedimethanol and 30 to 75 mole ethylene glycol; 30 to 70 mole % 1,4-cyclohexanedimethanol and 30 to 70 mole % ethylene glycol; 35 to 70 mole % 1,4-cyclohexanedimethanol and 30 to 65 mole % ethylene glycol; 40 to 70 mole % 1,4-cyclohexanedimethanol and 30 to 60 mole % ethylene glycol; 45 to 70 mole % 1,4-cyclohexanedimethanol and 30 to 55 mole % ethylene glycol; 50 to 70 mole % 1,4-cyclohexanedimethanol and 30 to 50 mole % ethylene glycol; 55 to 70 mole % 1,4-cyclohexanedimethanol and 30 to 45 mole % ethylene glycol; 60 to 70 mole % 1,4-cyclohexanedimethanol and 30 to 40 mole % ethylene glycol; and 65 to 70 mole % 1,4-cyclohexanedimethanol and 30 to 35 mole ethylene glycol.

In other aspects of the invention, the glycol component for the polyesters useful in the invention include but are not limited to at least one of the following ranges: 0.01 to 65 mole % 1,4-cyclohexanedimethanol and 35 to 99.99 mole % ethylene glycol; 1 to 65 mole % 1,4-cyclohexanedimethanol and 35 to 99 mole % ethylene glycol; 5 to 65 mole % 1,4-cyclohexanedimethanol and 35 to 95 mole % ethylene glycol; 10 to 65 mole 1,4-cyclohexanedimethanol and 35 to 90 mole % ethylene glycol; 15 to 65 mole % 1,4-cyclohexanedimethanol and 35 to 85 mole % ethylene glycol; 20 to 65 mole % 1,4-cyclohexanedimethanol and 35 to 80 mole % ethylene glycol, 25 to 65 mole % 1,4-cyclohexanedimethanol and 35 to 75 mole ethylene glycol; 30 to 65 mole % 1,4-cyclohexanedimethanol and 35 to 70 mole % ethylene glycol; 35 to 65 mole % 1,4-cyclohexanedimethanol and 35 to 65 mole % ethylene glycol; 40 to 65 mole % 1,4-cyclohexanedimethanol and 35 to 60 mole % ethylene glycol; 45 to 65 mole % 1,4-cyclohexanedimethanol and 35 to 55 mole % ethylene glycol; 50 to 65 mole % 1,4-cyclohexanedimethanol and 35 to 50 mole % ethylene glycol; 55 to 65 mole % 1,4-cyclohexanedimethanol and 35 to 45 mole % ethylene glycol; and 60 to 65 mole % 1,4-cyclohexanedimethanol and 35 to 40 mole ethylene glycol.

In other aspects of the invention, the glycol component for the polyesters useful in the invention include but are not limited to at least one of the following ranges: 0.01 to 60 mole % 1,4-cyclohexanedimethanol and 40 to 99.99 mole % ethylene glycol; 1 to 60 mole % 1,4-cyclohexanedimethanol and 40 to 99 mole % ethylene glycol; 5 to 60 mole % 1,4-cyclohexanedimethanol and 40 to 95 mole % ethylene glycol;

10 to 60 mole 1,4-cyclohexanedimethanol and 40 to 90 mole % ethylene glycol; 15 to 60 mole % 1,4-cyclohexanedimethanol and 40 to 85 mole % ethylene glycol; 20 to 60 mole % 1,4-cyclohexanedimethanol and 40 to 80 mole % ethylene glycol; 25 to 60 mole % 1,4-cyclohexanedimethanol and 40 to 75 mole ethylene glycol; 30 to 60 mole % 1,4-cyclohexanedimethanol and 40 to 70 mole % ethylene glycol; 35 to 60 mole % 1,4-cyclohexanedimethanol and 40 to 65 mole % ethylene glycol; 40 to 60 mole % 1,4-cyclohexanedimethanol and 40 to 60 mole % ethylene glycol; 45 to 60 mole % 1,4-cyclohexanedimethanol and 40 to 55 mole % ethylene glycol; 50 to 60 mole % 1,4-cyclohexanedimethanol and 40 to 50 mole % ethylene glycol; 55 to 60 mole % 1,4-cyclohexanedimethanol and 40 to 45 mole % ethylene glycol.

In other aspects of the invention, the glycol component for the polyesters useful in the invention include but are not limited to at least one of the following ranges: 0.01 to 55 mole % 1,4-cyclohexanedimethanol and 45 to 99.99 mole % ethylene glycol; 1 to 55 mole % 1,4-cyclohexanedimethanol and 45 to 99 mole % ethylene glycol; 5 to 55 mole % 1,4-cyclohexanedimethanol and 45 to 95 mole % ethylene glycol; 10 to 55 mole % 1,4-cyclohexanedimethanol and 45 to 90 mole % ethylene glycol; 15 to 55 mole % 1,4-cyclohexanedimethanol and 45 to 85 mole % ethylene glycol; 20 to 55 mole % 1,4-cyclohexanedimethanol and 45 to 80 mole % ethylene glycol; 25 to 55 mole % 1,4-cyclohexanedimethanol and 45 to 75 mole % ethylene glycol; 30 to 55 mole % 1,4-cyclohexanedimethanol and 45 to 70 mole % ethylene glycol; 35 to 55 mole % 1,4-cyclohexanedimethanol and 45 to 65 mole % ethylene glycol; 40 to 55 mole % 1,4-cyclohexanedimethanol and 45 to 60 mole % ethylene glycol; 45 to 55 mole % 1,4-cyclohexanedimethanol and 45 to 55 mole % ethylene glycol; and 50 to 55 mole % 1,4-cyclohexanedimethanol and 45 to 50 mole % ethylene glycol.

In other aspects of the invention, the glycol component for the polyesters useful in the invention include but are not limited to at least one of the following ranges: 0.01 to 50 mole % 1,4-cyclohexanedimethanol and 50 to 99.99 mole % ethylene glycol; 1 to 50 mole % 1,4-cyclohexanedimethanol and 50 to 99 mole % ethylene glycol; 5 to 50 mole % 1,4-cyclohexanedimethanol and 50 to 95 mole % ethylene glycol; 10 to 50 mole % 1,4-cyclohexanedimethanol and 50 to 90 mole % ethylene glycol; 15 to 50 mole % 1,4-cyclohexanedimethanol and 50 to 85 mole % ethylene glycol; 20 to 50 mole % 1,4-cyclohexanedimethanol and 50 to 80 mole % ethylene glycol 25 to 50 mole % 1,4-cyclohexanedimethanol and 50 to 75 mole % ethylene glycol; 30 to 50 mole % 1,4-cyclohexanedimethanol and 50 to 70 mole % ethylene glycol; 35 to 50 mole % 1,4-cyclohexanedimethanol and 50 to 65 mole % ethylene glycol; 40 to 50 mole % 1,4-cyclohexanedimethanol and 50 to 60 mole % ethylene glycol; and 45 to 50 mole % 1,4-cyclohexanedimethanol and 50 to 55 mole % ethylene glycol.

In other aspects of the invention, the glycol component for the polyesters useful in the invention include but are not limited to at least one of the following ranges: 0.01 to 45 mole % 1,4-cyclohexanedimethanol and 55 to 99.99 mole % ethylene glycol; 1 to 45 mole % 1,4-cyclohexanedimethanol and 55 to 99 mole % ethylene glycol; 5 to 45 mole % 1,4-cyclohexanedimethanol and 50 to 95 mole % ethylene glycol; 10 to 45 and 55 to 95 mole % ethylene glycol mole % 1,4-cyclohexanedimethanol; 15 to 45 mole % 1,4-cyclohexanedimethanol and 55 to 85 mole % ethylene glycol; 20 to 45 mole % 1,4-cyclohexanedimethanol and 55 to 80 mole % ethylene glycol; 25 to 45 mole % 1,4-cyclohexanedimethanol and 55 to 75 mole % ethylene glycol; 30 to 45 mole % 1,4-cyclohexanedimethanol and 55 to 65 mole % ethylene glycol; 35 to 45 mole % 1,4-cyclohexanedimethanol and 55 to 65 mole % ethylene glycol; 40 to 45 mole % 1,4-cyclohexanedimethanol and 55 to 60 mole % ethylene glycol.

In other aspects of the invention, the glycol component for the polyesters useful in the invention include but are not limited to at least one of the following ranges: 0.01 to 40 mole % 1,4-cyclohexanedimethanol and 60 to 99.99 mole % ethylene glycol; 1 to 40 mole % 1,4-cyclohexanedimethanol and 60 to 99 mole % ethylene glycol; 5 to 40 mole % 1,4-cyclohexanedimethanol and 60 to 95 mole % ethylene glycol; 10 to 40 mole % 1,4-cyclohexanedimethanol and 60 to 90 mole % ethylene glycol; 15 to 40 mole % 1,4-cyclohexanedimethanol and 60 to 85 mole % ethylene glycol; 20 to 40 mole % 1,4-cyclohexanedimethanol and 60 to 80 mole % ethylene glycol; 25 to 40 mole % 1,4-cyclohexanedimethanol and 60 to 75 mole % ethylene glycol; 30 to 40 mole % 1,4-cyclohexanedimethanol and 60 to 70 mole % ethylene glycol; 35 to 40 mole % 1,4-cyclohexanedimethanol and 60 to 65 mole % ethylene glycol.

In other aspects of the invention, the glycol component for the polyesters useful in the invention include but are not limited to at least one of the following ranges: 0.01 to 35 mole % 1,4-cyclohexanedimethanol and 65 to 99.99 mole % ethylene glycol; 1 to 35 mole % 1,4-cyclohexanedimethanol and 65 to 99 mole % ethylene glycol; 5 to 35 mole % 1,4-cyclohexanedimethanol and 65 to 95 mole % ethylene glycol; 10 to 35 mole % 1,4-cyclohexanedimethanol and 65 to 90 mole % ethylene glycol; 15 to 35 mole % 1,4-cyclohexanedimethanol and 65 to 85 mole % ethylene glycol; 20 to 35 mole % 1,4-cyclohexanedimethanol and 65 to 80 mole % ethylene gycol; 25 to 35 mole % 1,4-cyclohexanedimethanol and 65 to 75 mole % ethylene glycol; 30 to 35 mole % 1,4-cyclohexanedimethanol and 65 to 70 mole % ethylene glycol.

In other aspects of the invention, the glycol component for the polyesters useful in the invention include but are not limited to at least one of the following ranges: 0.01 to 30 mole % 1,4-cyclohexanedimethanol and 70 to 99.99 mole % mole % ethylene glycol; 1 to 30 mole % 1,4-cyclohexanedimethanol and 70 to 99 mole % ethylene glycol; 5 to 30 mole % 1,4-cyclohexanedimethanol and 70 to 95 mole % ethylene glycol; 10 to 30 mole % 1,4-cyclohexanedimethanol and 70 to 90 mole % ethylene glycol; 15 to 30 mole % 1,4-cyclohexanedimethanol and 70 to 85 mole % ethylene glycol; 20 to 30 mole % 1,4-cyclohexanedimethanol and 70 to 80 mole % ethylene glycol; 25 to 30 mole % 1,4-cyclohexanedimethanol and 70 to 75 mole % ethylene glycol.

In other aspects of the invention, the glycol component for the polyesters useful in the invention include but are not limited to at least one of the following ranges: 0.01 to 25 mole % 1,4-cyclohexanedimethanol and 75 to 99.99 mole % ethylene glycol; 1 to 25 mole % 1,4-cyclohexanedimethanol and 75 to 99 mole % ethylene glycol; 5 to 25 mole % 1,4-cyclohexanedimethanol and 75 to 95 mole % ethylene glycol; 10 to 25 mole % 1,4-cyclohexanedimethanol and 75 to 90 mole % ethylene glycol; 15 to 25 mole % 1,4-cyclohexanedimethanol and 75 to 85 mole % ethylene glycol; 20 to 25 mole % 1,4-cyclohexanedimethanol and 75 to 80 mole % ethylene glycol.

In other aspects of the invention, the glycol component for the polyesters useful in the invention include but are not limited to at least one of the following ranges: 0.01 to 20 mole % 1,4-cyclohexanedimethanol and 80 to 99.99 mole % ethylene glycol; 1 to 20 mole % 1,4-cyclohexanedimethanol and 80 to 99 mole % ethylene glycol; 5 to 20 mole % 1,4-cyclohexanedimethanol and 80 to 95 mole % ethylene glycol;

10 to 20 mole % 1,4-cyclohexanedimethanol and 80 to 90 mole % ethylene glycol; and 15 to 20 mole % 1,4-cyclohexanedimethanol and 80 to 85 mole % ethylene glycol.

In other aspects of the invention, the glycol component for the polyesters useful in the invention include but are not limited to at least one of the following ranges: 0.01 to 15 mole % 1,4-cyclohexanedimethanol and 85 to 99.99 mole % ethylene glycol; 1 to 15 mole % 1,4-cyclohexanedimethanol and 85 to 99 mole % ethylene glycol; 5 to 15 mole % 1,4-cyclohexanedimethanol and 85 to 95 mole % ethylene glycol; and 10 to 15 mole % 1,4-cyclohexanedimethanol and 85 to 90 mole % ethylene glycol.

In other aspects of the invention, the glycol component for the polyesters useful in the invention include but are not limited to at least one of the following ranges: 0.01 to 10 mole % 1,4-cyclohexanedimethanol and 90 to 99.99 mole % ethylene glycol; 1 to 10 mole % 1,4-cyclohexanedimethanol and 90 to 99 mole % ethylene glycol; 5 to 10 mole % 1,4-cyclohexanedimethanol and 90 to 95 mole % ethylene glycol; 0.01 to 5 mole % 1,4-cyclohexanedimethanol and 95 to 99.99 mole % ethylene glycol and 1 to 5 mole % 1,4-cyclohexanedimethanol and 95 to 99 mole % ethylene glycol.

The polyesters useful in the invention include but are not limited to at least one of the following ranges: 0.01 to 99 mole % 1,4-cyclohexanedimethanol and 1 to 99.99 mole % 2,2,4,4-tetramethyl-1,3-cyclobutanediol; 1 to 99 mole % 1,4-cyclohexanedimethanol and 1 to 99 mole % 2,2,4,4-tetramethyl-1,3-cyclobutanediol; 5 to 99 mole % 1,4-cyclohexanedimethanol and 1 to 95 mole % 2,2,4,4-tetramethyl-1,3-cyclobutanediol; 10 to 99 mole % 1,4-cyclohexanedimethanol and 1 to 90 mole % 2,2,4,4-tetramethyl-1,3-cyclobutanediol; 15 to 99 mole % 1,4-cyclohexanedimethanol and 1 to 85 mole % 2,2,4,4-tetramethyl-1,3-cyclobutanediol; 20 to 99 mole % 1,4-cyclohexanedimethanol and 1 to 80 mole % 2,2,4,4-tetramethyl-1,3-cyclobutanediol; 25 to 99 mole % 1,4-cyclohexanedimethanol and 1 to 75 mole % 2,2,4,4-tetramethyl-1,3-cyclobutanediol; 30 to 99 mole % 1,4-cyclohexanedimethanol and 1 to 70 mole % 2,2,4,4-tetramethyl-1,3-cyclobutanediol; 35 to 99 mole % 1,4-cyclohexanedimethanol and 1 to 65 mole % 2,2,4,4-tetramethyl-1,3-cyclobutanediol; 40 to 99 mole % 1,4-cyclohexanedimethanol and 1 to 60 mole % 2,2,4,4-tetramethyl-1,3-cyclobutanediol; 45 to 99 mole % 1,4-cyclohexanedimethanol and 1 to 55 mole % 2,2,4,4-tetramethyl-1,3-cyclobutanediol; 50 to 99 mole % 1,4-cyclohexanedimethanol and 1 to 50 mole % 2,2,4,4-tetramethyl-1,3-cyclobutanediol; 55 to 99 mole % 1,4-cyclohexanedimethanol and 1 to 50 mole % 2,2,4,4-tetramethyl-1,3-cyclobutanediol; 60 to 99 mole % 1,4-cyclohexanedimethanol and 1 to 40 mole % 2,2,4,4-tetramethyl-1,3-cyclobutanediol; 65 to 99 mole % 1,4-cyclohexanedimethanol and 1 to 35 mole % 2,2,4,4-tetramethyl-1,3-cyclobutanediol; 70 to 99 mole % 1,4-cyclohexanedimethanol and 1 to 30 mole % 2,2,4,4-tetramethyl-1,3-cyclobutanediol; 75 to 99 mole % 1,4-cyclohexanedimethanol and 1 to 25 mole % 2,2,4,4-tetramethyl-1,3-cyclobutanediol; 80 to 99 mole % 1,4-cyclohexanedimethanol and 1 to 20 mole % 2,2,4,4-tetramethyl-1,3-cyclobutanediol; 85 to 99 mole % 1,4-cyclohexanedimethanol and 1 to 15 mole % 2,2,4,4-tetramethyl-1,3-cyclobutanediol; 90 to 99 mole % 1,4-cyclohexanedimethanol and 1 to 10 mole % 2,2,4,4-tetramethyl-1,3-cyclobutanediol; 95 to 99 mole % 1,4-cyclohexanedimethanol and 1 to 5 mole % 2,2,4,4-tetramethyl-1,3-cyclobutanediol; 90 to less than 99.99 mole % 1,4-cyclohexanedimethanol and 0.01 to 10 mole % 2,2,4,4-tetramethyl-1,3-cyclobutanediol; 95 to less than 99.99 mole % 1,4-cyclohexanedimethanol and 0.01 to 5 mole % 2,2,4,4-tetramethyl-1,3-cyclobutanediol.

In other aspects of the invention, the glycol component for the polyesters useful in the film or sheet of the invention include but are not limited to at least one of the following ranges: 0.01 to 95 mole % 1,4-cyclohexanedimethanol and 5 to 99.99 mole % 2,2,4,4-tetramethyl-1,3-cyclobutanediol; 1 to 95 mole % 1,4-cyclohexanedimethanol and 5 to 99 mole % 2,2,4,4-tetramethyl-1,3-cyclobutanediol; 5 to 95 mole % 1,4-cyclohexanedimethanol and 5 to 95 mole % 2,2,4,4-tetramethyl-1,3-cyclobutanediol; 10 to 95 mole % 1,4-cyclohexanedimethanol and 5 to 90 mole % 2,2,4,4-tetramethyl-1,3-cyclobutanediol; 15 to 95 mole % 1,4-cyclohexanedimethanol and 5 to 85 mole % 2,2,4,4-tetramethyl-1,3-cyclobutanediol; 20 to 95 mole % 1,4-cyclohexanedimethanol and 5 to 80 mole % 2,2,4,4-tetramethyl-1,3-cyclobutanediol; 25 to 95 mole % 1,4-cyclohexanedimethanol and 5 to 75 mole % 2,2,4,4-tetramethyl-1,3-cyclobutanediol; 30 to 95 mole % 1,4-cyclohexanedimethanol and 5 to 70 mole % 2,2,4,4-tetramethyl-1,3-cyclobutanediol; 35 to 95 mole % 1,4-cyclohexanedimethanol and 5 to 65 mole % 2,2,4,4-tetramethyl-1,3-cyclobutanediol; 40 to 95 mole % 1,4-cyclohexanedimethanol and 5 to 60 mole % 2,2,4,4-tetramethyl-1,3-cyclobutanediol; 45 to 95 mole % 1,4-cyclohexanedimethanol and 5 to 55 mole % 2,2,4,4-tetramethyl-1,3-cyclobutanediol; 50 to 95 mole % 1,4-cyclohexanedimethanol and 5 to 50 mole % 2,2,4,4-tetramethyl-1,3-cyclobutanediol; 55 to 95 mole % 1,4-cyclohexanedimethanol and 5 to 45 mole % 2,2,4,4-tetramethyl-1,3-cyclobutanediol; 60 to 95 mole % 1,4-cyclohexanedimethanol and 5 to 40 mole % 2,2,4,4-tetramethyl-1,3-cyclobutanediol; 65 to 95 mole % 1,4-cyclohexanedimethanol and 5 to 35 mole % 2,2,4,4-tetramethyl-1,3-cyclobutanediol; 70 to 95 mole % 1,4-cyclohexanedimethanol and 5 to 30 mole % 2,2,4,4-tetramethyl-1,3-cyclobutanediol; 75 to 95 mole % 1,4-cyclohexanedimethanol and 5 to 25 mole % 2,2,4,4-tetramethyl-1,3-cyclobutanediol; 80 to 95 mole % 1,4-cyclohexanedimethanol and 5 to 20 mole % 2,2,4,4-tetramethyl-1,3-cyclobutanediol; 85 to 95 mole % 1,4-cyclohexanedimethanol and 5 to 15 mole % 2,2,4,4-tetramethyl-1,3-cyclobutanediol; 90 to 95 mole % 1,4-cyclohexanedimethanol and 5 to 10 mole % 2,2,4,4-tetramethyl-1,3-cyclobutanediol.

In other aspects of the invention, the glycol component for the polyesters useful in the film or sheet of the invention include but are not limited to at least one of the following ranges: 0.01 to 90 mole % 1,4-cyclohexanedimethanol and 10 to 99.99 mole % 2,2,4,4-tetramethyl-1,3-cyclobutanediol; 1 to 90 mole % 1,4-cyclohexanedimethanol and 10 to 99 mole % 2,2,4,4-tetramethyl-1,3-cyclobutanediol; 5 to 90 mole % 1,4-cyclohexanedimethanol and 10 to 95 mole % 2,2,4,4-tetramethyl-1,3-cyclobutanediol; 10 to 90 mole % 1,4-cyclohexanedimethanol and 10 to 90 mole % 2,2,4,4-tetramethyl-1,3-cyclobutanediol; 15 to 90 mole % 1,4-cyclohexanedimethanol and 10 to 85 mole % 2,2,4,4-tetramethyl-1,3-cyclobutanediol; 20 to 90 mole % 1,4-cyclohexanedimethanol and 10 to 80 mole % 2,2,4,4-tetramethyl-1,3-cyclobutanediol, 25 to 90 mole % 1,4-cyclohexanedimethanol and 10 to 75 mole % 2,2,4,4-tetramethyl-1,3-cyclobutanediol; 30 to 90 mole % 1,4-cyclohexanedimethanol and 10 to 70 mole % 2,2,4,4-tetramethyl-1,3-cyclobutanediol; 35 to 90 mole % 1,4-cyclohexanedimethanol and 10 to 65 mole % 2,2,4,4-tetramethyl-1,3-cyclobutanediol; 40 to 90 mole % 1,4- cyclohexanedimethanol and 10 to 60 mole % 2,2,4,4-tetramethyl-1,3-cyclobutanediol; 45 to 90 mole % 1,4-cyclohexanedimethanol and 10 to 55 mole % 2,2,4,4-tetramethyl-1,3-cyclobutanediol; 50 to 90 mole % 1,4-cyclohexanedimethanol and 10 to 50 mole % 2,2,4,4-tetramethyl-1,3-cyclobutanediol.

In other aspects of the invention, the glycol component for the polyesters useful in the invention include but are not limited to at least one of the following ranges: 55 to 90 mole % 1,4-cyclohexanedimethanol and 10 to 45 mole % 2,2,4,4-tetramethyl-1,3-cyclobutanediol; 60 to 90 mole % 1,4-cyclohexanedimethanol and 10 to 40 mole % 2,2,4,4-tetramethyl-1,3-cyclobutanediol; 65 to 90 mole % 1,4-cyclohexanedimethanol and 10 to 35 mole % 2,2,4,4-tetramethyl-1,3-cyclobutanediol; 70 to 90 mole % 1,4-cyclohexanedimethanol and 10 to 30 mole % 2,2,4,4-tetramethyl-1,3-cyclobutanediol; 75 to 90 mole % 1,4-cyclohexanedimethanol and 10 to 25 mole % 2,2,4,4-tetramethyl-1,3-cyclobutanediol; 80 to 90 mole % 1,4-cyclohexanedimethanol and 10 to 20 mole % 2,2,4,4-tetramethyl-1,3-cyclobutanediol; 85 to 90 mole % 1,4-cyclohexanedimethanol and 10 to 15 mole % 2,2,4,4-tetramethyl-1,3-cyclobutanediol.

In other aspects of the invention, the glycol component for the polyesters useful in the invention include but are not limited to at least one of the following ranges: 0.01 to 85 mole % 1,4-cyclohexanedimethanol and 15 to 99.99 mole % 2,2,4,4-tetramethyl-1,3-cyclobutanediol; 1 to 85 mole % 1,4-cyclohexanedimethanol and 15 to 99 mole % 2,2,4,4-tetramethyl-1,3-cyclobutanediol; 5 to 85 mole % 1,4-cyclohexanedimethanol and 15 to 95 mole % 2,2,4,4-tetramethyl-1,3-cyclobutanediol; 10 to 85 mole % 1,4-cyclohexanedimethanol and 15 to 90 mole % 2,2,4,4-tetramethyl-1,3-cyclobutanediol; 15 to 85 mole % 1,4-cyclohexanedimethanol and 15 to 85 mole % 2,2,4,4-tetramethyl-1,3-cyclobutanediol; 20 to 85 mole % 1,4-cyclohexanedimethanol and 15 to 80 mole % 2,2,4,4-tetramethyl-1,3-cyclobutanediol; 25 to 85 mole % 1,4-cyclohexanedimethanol and 15 to 75 mole % 2,2,4,4-tetramethyl-1,3-cyclobutanediol; 30 to 85 mole % 1,4-cyclohexanedimethanol and 15 to 70 mole % 2,2,4,4-tetramethyl-1,3-cyclobutanediol; 35 to 85 mole % 1,4-cyclohexanedimethanol and 15 to 65 mole % 2,2,4,4-tetramethyl-1,3-cyclobutanediol; 40 to 85 mole % 1,4-cyclohexanedimethanol and 15 to 60 mole % 2,2,4,4-tetramethyl-1,3-cyclobutanediol; 45 to 85 mole % 1,4-cyclohexanedimethanol 15 to 55 mole % 2,2,4,4-tetramethyl-1,3-cyclobutanediol; 50 to 85 mole % 1,4-cyclohexanedimethanol and 15 to 50 mole % 2,2,4,4-tetramethyl-1,3-cyclobutanediol.

In other aspects of the invention, the glycol component for the polyesters useful in the invention include but are not limited to at least one of the following ranges: 55 to 85 mole % 1,4-cyclohexanedimethanol and 15 to 45 mole % 2,2,4,4-tetramethyl-1,3-cyclobutanediol; 60 to 85 mole % 1,4-cyclohexanedimethanol and 15 to 40 mole % 2,2,4,4-tetramethyl-1,3-cyclobutanediol; 65 to 85 mole % 1,4-cyclohexanedimethanol and 15 to 35 mole % 2,2,4,4-tetramethyl-1,3-cyclobutanediol; 70 to 85 mole % 1,4-cyclohexanedimethanol and 15 to 30 mole % 2,2,4,4-tetramethyl-1,3-cyclobutanediol; 75 to 85 mole % 1,4-cyclohexanedimethanol and 15 to 25 mole % 2,2,4,4-tetramethyl-1,3-cyclobutanediol; 80 to 85 mole % 1,4-cyclohexanedimethanol and 15 to 20 mole % 2,2,4,4-tetramethyl-1,3-cyclobutanediol.

In other aspects of the invention, the glycol component for the polyesters useful in the invention include but are not limited to at least one of the following ranges: 0.01 to 80 mole % 1,4-cyclohexanedimethanol and 20 to 99.99 mole % 2,2,4,4-tetramethyl-1,3-cyclobutanediol; 1 to 80 mole % 1,4-cyclohexanedimethanol and 20 to 99 mole % 2,2,4,4-tetramethyl-1,3-cyclobutanediol; 5 to 80 mole % 1,4-cyclohexanedimethanol and 20 to 95 mole % 2,2,4,4-tetramethyl-1,3-cyclobutanediol; 10 to 80 mole % 1,4-cyclohexanedimethanol and 20 to 90 mole % 2,2,4,4-tetramethyl-1,3-cyclobutanediol; 15 to 80 mole % 1,4-cyclohexanedimethanol and 20 to 85 mole % 2,2,4,4-tetramethyl-1,3-cyclobutanediol; 20 to 80 mole % 1,4-cyclohexanedimethanol and 20 to 80 mole % 2,2,4,4-tetramethyl-1,3-cyclobutanediol; 25 to 80 mole % 1,4-cyclohexanedimethanol and 20 to 75 mole % 2,2,4,4-tetramethyl-1,3-cyclobutanediol; 30 to 80 mole % 1,4-cyclohexanedimethanol and 20 to 70 mole % 2,2,4,4-tetramethyl-1,3-cyclobutanediol; 35 to 80 mole % 1,4-cyclohexanedimethanol and 20 to 65 mole % 2,2,4,4-tetramethyl-1,3-cyclobutanediol; 40 to 80 mole % 1,4-cyclohexanedimethanol and 20 to 60 mole % 2,2,4,4-tetramethyl-1,3-cyclobutanediol; 45 to 80 mole % 1,4-cyclohexanedimethanol and 20 to 55 mole % 2,2,4,4-tetramethyl-1,3-cyclobutanediol; 50 to 80 mole % 1,4-cyclohexanedimethanol and 20 to 50 mole % 2,2,4,4-tetramethyl-1,3-cyclobutanediol; 55 to 80 mole % 1,4-cyclohexanedimethanol and 20 to 45 mole % 2,2,4,4-tetramethyl-1,3-cyclobutanediol; 60 to 80 mole % 1,4-cyclohexanedimethanol and 20 to 40 mole % 2,2,4,4-tetramethyl-1,3-cyclobutanediol; 65 to 80 mole % 1,4-cyclohexanedimethanol and 20 to 35 mole % 2,2,4,4-tetramethyl-1,3-cyclobutanediol; 70 to 80 mole % 1,4-cyclohexanedimethanol and 20 to 30 mole % 2,2,4,4-tetramethyl-1,3-cyclobutanediol; and 75 to 80 mole % 1,4-cyclohexanedimethanol and 20 to 25 mole % 2,2,4,4-tetramethyl-1,3-cyclobutanediol.

In other aspects of the invention, the glycol component for the polyesters useful in the invention include but are not limited to at least one of the following ranges: 0.01 to 75 mole % 1,4-cyclohexanedimethanol and 25 to 99.99 mole % 2,2,4,4-tetramethyl-1,3-cyclobutanediol; 1 to 75 mole % 1,4-cyclohexanedimethanol and 25 to 99 mole % 2,2,4,4-tetramethyl-1,3-cyclobutanediol; 5 to 75 mole % 1,4-cyclohexanedimethanol and 25 to 95 mole % 2,2,4,4-tetramethyl-1,3-cyclobutanediol; 10 to 75 mole % 1,4-cyclohexanedimethanol and 25 to 90 mole % 2,2,4,4-tetramethyl-1,3-cyclobutanediol; 15 to 75 mole % 1,4-cyclohexanedimethanol and 25 to 85 mole % 2,2,4,4-tetramethyl-1,3-cyclobutanediol; 20 to 75 mole % 1,4-cyclohexanedimethanol and 25 to 80 mole % 2,2,4,4-tetramethyl-1,3-cyclobutanediol; 25 to 75 mole % 1,4-cyclohexanedimethanol and 25 to 75 mole % 2,2,4,4-tetramethyl-1,3-cyclobutanediol; 30 to 75 mole % 1,4-cyclohexanedimethanol and 25 to 70 mole % 2,2,4,4-tetramethyl-1,3-cyclobutanediol; 35 to 75 mole % 1,4-cyclohexanedimethanol and 25 to 65 mole % 2,2,4,4-tetramethyl-1,3-cyclobutanediol; 40 to 75 mole % 1,4-cyclohexanedimethanol and 25 to 60 mole % 2,2,4,4-tetramethyl-1,3-cyclobutanediol; 45 to 75 mole % 1,4-cyclohexanedimethanol and 25 to 55 mole % 2,2,4,4-tetramethyl-1,3-cyclobutanediol; 50 to 75 mole % 1,4-cyclohexanedimethanol and 25 to 50 mole % 2,2,4,4-tetramethyl-1,3-cyclobutanediol; 55 to 75 mole % 1,4-cyclohexanedimethanol and 25 to 45 mole % 2,2,4,4-tetramethyl-1,3-cyclobutanediol; 60 to 75 mole % 1,4-cyclohexanedimethanol and 25 to 40 mole % 2,2,4,4-tetramethyl-1,3-cyclobutanediol; 65 to 75 mole % 1,4-cyclohexanedimethanol and 25 to 35 mole % 2,2,4,4- tetramethyl-1,3-cyclobutanediol; and 70 to 75 mole % 1,4-cyclohexanedimethanol and 25 to 30 mole % 2,2,4,4-tetramethyl-1,3-cyclobutanediol.

In other aspects of the invention, the glycol component for the polyesters useful in the invention include but are not limited to at least one of the following ranges: 0.01 to 65 mole % 1,4-cyclohexanedimethanol and 35 to 99.99 mole % 2,2,4,4-tetramethyl-1,3-cyclobutanediol; 1 to 65 mole % 1,4-cyclohexanedimethanol and 35 to 99 mole % 2,2,4,4-tetramethyl-1,3-cyclobutanediol; 5 to 65 mole % 1,4-cyclohexanedimethanol and 35 to 95 mole % 2,2,4,4-tetramethyl-1,3-cyclobutanediol; 10 to 65 mole % 1,4-cyclohexanedimethanol and 35 to 90 mole % 2,2,4,4-tetramethyl-1,3-cyclobutanediol; 15 to 65 mole % 1,4-cyclohexanedimethanol and 35 to 85 mole % 2,2,4,4-tetramethyl-1,3-cyclobutanediol; 20 to 65 mole % 1,4-cyclohexanedimethanol and 35 to 80 mole % 2,2,4,4-tetramethyl-1,3-cyclobutanediol, 25 to 65 mole % 1,4-cyclohexanedimethanol and 35 to 75 mole % 2,2,4,4-tetramethyl-1,3-cyclobutanediol; 30 to 65 mole % 1,4-cyclohexanedimethanol and 35 to 70 mole % 2,2,4,4-tetramethyl-1,3-cyclobutanediol; 35 to 65 mole % 1,4-cyclohexanedimethanol and 35 to 65 mole % 2,2,4,4-tetramethyl-1,3-cyclobutanediol; 40 to 65 mole % 1,4-cyclohexanedimethanol and 35 to 60 mole % 2,2,4,4-tetramethyl-1,3-cyclobutanediol; 45 to 65 mole % 1,4-cyclohexanedimethanol and 35 to 55 mole % 2,2,4,4-tetramethyl-1,3-cyclobutanediol; 50 to 65 mole % 1,4-cyclohexanedimethanol and 35 to 50 mole % 2,2,4,4-tetramethyl-1,3-cyclobutanediol; 55 to 65 mole % 1,4-cyclohexanedimethanol and 35 to 45 mole % 2,2,4,4-tetramethyl-1,3-cyclobutanediol; and 60 to 65 mole % 1,4-cyclohexanedimethanol and 35 to 40 mole % 2,2,4,4-tetramethyl-1,3-cyclobutanediol.

In other aspects of the invention, the glycol component for the polyesters useful in the invention include but are not limited to at least one of the following ranges: 0.01 to 60 mole % 1,4-cyclohexanedimethanol and 40 to 99.99 mole % 2,2,4,4-tetramethyl-1,3-cyclobutanediol; 1 to 60 mole % 1,4-cyclohexanedimethanol and 40 to 99 mole % 2,2,4,4-tetramethyl-1,3-cyclobutanediol; 5 to 60 mole % 1,4-cyclohexanedimethanol and 40 to 95 mole % 2,2,4,4-tetramethyl-1,3-cyclobutanediol; 10 to 60 mole % 1,4-cyclohexanedimethanol and 40 to 90 mole % 2,2,4,4-tetramethyl-1,3-cyclobutanediol; 15 to 60 mole % 1,4-cyclohexanedimethanol and 40 to 85 mole % 2,2,4,4-tetramethyl-1,3-cyclobutanediol; 20 to 60 mole % 1,4-cyclohexanedimethanol and 40 to 80 mole % 2,2,4,4-tetramethyl-1,3-cyclobutanediol; 25 to 60 mole % 1,4-cyclohexanedimethanol and 40 to 75 mole % 2,2,4,4-tetramethyl-1,3-cyclobutanediol; 30 to 60 mole % 1,4-cyclohexanedimethanol and 40 to 70 mole % 2,2,4,4-tetramethyl-1,3-cyclobutanediol; 35 to 60 mole % 1,4-cyclohexanedimethanol and 40 to 65 mole % 2,2,4,4-tetramethyl-1,3-cyclobutanediol; 40 to 60 mole % 1,4-cyclohexanedimethanol and 40 to 60 mole % 2,2,4,4-tetramethyl-1,3-cyclobutanediol; 45 to 60 mole % 1,4-cyclohexanedimethanol and 40 to 55 mole % 2,2,4,4-tetramethyl-1,3-cyclobutanediol; 50 to 60 mole % 1,4-cyclohexanedimethanol and 40 to 50 mole % 2,2,4,4-tetramethyl-1,3-cyclobutanediol; 55 to 60 mole % 1,4-cyclohexanedimethanol and 40 to 45 mole % 2,2,4,4-tetramethyl-1,3-cyclobutanediol.

In other aspects of the invention, the glycol component for the polyesters useful in the invention include but are not limited to at least one of the following ranges: 0.01 to 55 mole % 1,4-cyclohexanedimethanol and 45 to 99.99 mole % 2,2,4,4-tetramethyl-1,3-cyclobutanediol; 1 to 55 mole % 1,4-cyclohexanedimethanol and 45 to 99 mole % 2,2,4,4-tetramethyl-1,3-cyclobutanediol; 5 to 55 mole % 1,4-cyclohexanedimethanol and 45 to 95 mole % 2,2,4,4-tetramethyl-1,3-cyclobutanediol; 10 to 55 mole % 1,4-cyclohexanedimethanol and 45 to 90 mole % 2,2,4,4-tetramethyl-1,3-cyclobutanediol; 15 to 55 mole % 1,4-cyclohexanedimethanol and 45 to 85 mole % 2,2,4,4-tetramethyl-1,3-cyclobutanediol; 20 to 55 mole % 1,4-cyclohexanedimethanol and 45 to 80 mole % 2,2,4,4-tetramethyl-1,3-cyclobutanediol; 25 to 55 mole % 1,4-cyclohexanedimethanol and 45 to 75 mole % 2,2,4,4-tetramethyl-1,3-cyclobutanediol; 30 to 55 mole % 1,4-cyclohexanedimethanol and 45 to 70 mole % 2,2,4,4-tetramethyl-1,3-cyclobutanediol; 35 to 55 mole % 1,4-cyclohexanedimethanol and 45 to 65 mole % 2,2,4,4-tetramethyl-1,3-cyclobutanediol; 40 to 55 mole % 1,4-cyclohexanedimethanol and 45 to 60 mole % 2,2,4,4-tetramethyl-1,3-cyclobutanediol; 45 to 55 mole % 1,4-cyclohexanedimethanol and 45 to 55 mole % 2,2,4,4-tetramethyl-1,3-cyclobutanediol; and 50 to 55 mole % 1,4-cyclohexanedimethanol and 45 to 50 mole % 2,2,4,4-tetramethyl-1,3-cyclobutanediol.

In other aspects of the invention, the glycol component for the polyesters useful in the invention include but are not limited to at least one of the following ranges: 0.01 to 50 mole % 1,4-cyclohexanedimethanol and 50 to 99.99 mole % 2,2,4,4-tetramethyl-1,3-cyclobutanediol; 1 to 50 mole % 1,4-cyclohexanedimethanol and 50 to 99 mole % 2,2,4,4-tetramethyl-1,3-cyclobutanediol; 5 to 50 mole % 1,4-cyclohexanedimethanol and 50 to 95 mole % 2,2,4,4-tetramethyl-1,3-cyclobutanediol; 10 to 50 mole % 1,4-cyclohexanedimethanol and 50 to 90 mole % 2,2,4,4-tetramethyl-1,3-cyclobutanediol; 15 to 50 mole % 1,4-cyclohexanedimethanol and 50 to 85 mole % 2,2,4,4-tetramethyl-1,3-cyclobutanediol; 20 to 50 mole % 1,4-cyclohexanedimethanol and 50 to 80 mole % 2,2,4,4-tetramethyl-1,3-cyclobutanediol 25 to 50 mole % 1,4-cyclohexanedimethanol and 50 to 75 mole % 2,2,4,4-tetramethyl-1,3-cyclobutanediol; 30 to 50 mole % 1,4-cyclohexanedimethanol and 50 to 70 mole % 2,2,4,4-tetramethyl-1,3-cyclobutanediol; 35 to 50 mole % 1,4-cyclohexanedimethanol and 50 to 65 mole % 2,2,4,4-tetramethyl-1,3-cyclobutanediol; 40 to 50 mole % 1,4-cyclohexanedimethanol and 50 to 60 mole % 2,2,4,4-tetramethyl-1,3-cyclobutanediol; and 45 to 50 mole % 1,4-cyclohexanedimethanol and 50 to 55 mole % 2,2,4,4-tetramethyl-1,3-cyclobutanediol.

In other aspects of the invention, the glycol component for the polyesters useful in the invention include but are not limited to at least one of the following ranges: 0.01 to 45 mole % 1,4-cyclohexanedimethanol and 55 to 99.99 mole % 2,2,4,4-tetramethyl-1,3-cyclobutanediol; 1 to 45 mole % 1,4-cyclohexanedimethanol and 55 to 99 mole % 2,2,4,4-tetramethyl-1,3-cyclobutanediol; 5 to 45 mole % 1,4-cyclohexanedimethanol and 50 to 95 mole % 2,2,4,4-tetramethyl-1,3-cyclobutanediol; 10 to 45 and 55 to 95 mole 2,2,4,4-tetramethyl-1,3-cyclobutanediol mole % 1,4-cyclohexanedimethanol; 15 to 45 mole % 1,4-cyclohexanedimethanol and 55 to 85 mole % 2,2,4,4-tetramethyl-1,3-cyclobutanediol; 20 to 45 mole % 1,4-cyclohexanedimethanol and 55 to 80 mole % 2,2,4,4-tetramethyl-1,3-cyclobutanediol; 25 to 45 mole % 1,4-cyclohexanedimethanol and 55 to 75 mole % 2,2,4,4-tetramethyl-1,3-cyclobutanediol; 30 to 45 mole % 1,4-cyclohexanedimethanol and 55 to 65 mole % 2,2,4,4-tetramethyl-1,3-cyclobutanediol; 35 to 45 mole % 1,4- cyclohexanedimethanol and 55 to 65 mole % 2,2,4,4-tetramethyl-1,3-cyclobutanediol; 40 to 45 mole % 1,4-cyclohexanedimethanol and 55 to 60 mole % 2,2,4,4-tetramethyl-1,3-cyclobutanediol.

In other aspects of the invention, the glycol component for the polyesters useful in the invention include but are not limited to at least one of the following ranges: 0.01 to 40 mole % 1,4-cyclohexanedimethanol and 60 to 99.99 mole % 2,2,4,4-tetramethyl-1,3-cyclobutanediol; 1 to 40 mole % 1,4-cyclohexanedimethanol and 60 to 99 mole % 2,2,4,4-tetramethyl-1,3-cyclobutanediol; 5 to 40 mole % 1,4-cyclohexanedimethanol and 60 to 95 mole % 2,2,4,4-tetramethyl-1,3-cyclobutanediol; 10 to 40 mole % 1,4-cyclohexanedimethanol and 60 to 90 mole % 2,2,4,4-tetramethyl-1,3-cyclobutanediol; 15 to 40 mole % 1,4-cyclohexanedimethanol and 60 to 85 mole % 2,2,4,4-tetramethyl-1,3-cyclobutanediol; 20 to 40 mole % 1,4-cyclohexanedimethanol and 60 to 80 mole % 2,2,4,4-tetramethyl-1,3-cyclobutanediol; 25 to 40 mole % 1,4-cyclohexanedimethanol and 60 to 75 mole % 2,2,4,4-tetramethyl-1,3-cyclobutanediol; 30 to 40 mole % 1,4-cyclohexanedimethanol and 60 to 70 mole % 2,2,4,4-tetramethyl-1,3-cyclobutanediol; 35 to 40 mole % 1,4-cyclohexanedimethanol and 60 to 65 mole % 2,2,4,4-tetramethyl-1,3-cyclobutanediol.

In other aspects of the invention, the glycol component for the polyesters useful in the invention include but are not limited to at least one of the following ranges: 0.01 to 35 mole % 1,4-cyclohexanedimethanol and 65 to 99.99 mole % 2,2,4,4-tetramethyl-1,3-cyclobutanediol; 1 to 35 mole % 1,4-cyclohexanedimethanol and 65 to 99 mole % 2,2,4,4-tetramethyl-1,3-cyclobutanediol; 5 to 35 mole % 1,4-cyclohexanedimethanol and 65 to 95 mole % 2,2,4,4-tetramethyl-1,3-cyclobutanediol; 10 to 35 mole % 1,4-cyclohexanedimethanol and 65 to 90 mole % 2,2,4,4-tetramethyl-1,3-cyclobutanediol; 15 to 35 mole % 1,4-cyclohexanedimethanol and 65 to 85 mole % 2,2,4,4-tetramethyl-1,3-cyclobutanediol; 20 to 35 mole % 1,4-cyclohexanedimethanol and 65 to 80 mole % 2,2,4,4-tetramethyl-1,3-cyclobutanediol; 25 to 35 mole % 1,4-cyclohexanedimethanol and 65 to 75 mole % 2,2,4,4-tetramethyl-1,3-cyclobutanediol; 30 to 35 mole % 1,4-cyclohexanedimethanol and 65 to 70 mole % 2,2,4,4-tetramethyl-1,3-cyclobutanediol.

In other aspects of the invention, the glycol component for the polyesters useful in the invention include but are not limited to at least one of the following ranges: 0.01 to 30 mole % 1,4-cyclohexanedimethanol and 70 to 99.99 mole % 2,2,4,4-tetramethyl-1,3-cyclobutanediol; 1 to 30 mole % 1,4-cyclohexanedimethanol and 70 to 99 mole % 2,2,4,4-tetramethyl-1,3-cyclobutanediol; 5 to 30 mole % 1,4-cyclohexanedimethanol and 70 to 95 mole % 2,2,4,4-tetramethyl-1,3-cyclobutanediol; 10 to 30 mole % 1,4-cyclohexanedimethanol and 70 to 90 mole % 2,2,4,4-tetramethyl-1,3-cyclobutanediol; 15 to 30 mole % 1,4-cyclohexanedimethanol and 70 to 85 mole % 2,2,4,4-tetramethyl-1,3-cyclobutanediol; 20 to 30 mole % 1,4-cyclohexanedimethanol and 70 to 80 mole % 2,2,4,4-tetramethyl-1,3-cyclobutanediol; 25 to 30 mole % 1,4-cyclohexanedimethanol and 70 to 75 mole % 2,2,4,4-tetramethyl-1,3-cyclobutanediol.

In other aspects of the invention, the glycol component for the polyesters useful in the invention include but are not limited to at least one of the following ranges: 0.01 to 25 mole % 1,4-cyclohexanedimethanol and 75 to 99.99 mole % 2,2,4,4-tetramethyl-1,3-cyclobutanediol; 1 to 25 mole % 1,4-cyclohexanedimethanol and 75 to 99 mole % 2,2,4,4-tetramethyl-1,3-cyclobutanediol; 5 to 25 mole % 1,4-cyclohexanedimethanol and 75 to 95 mole % 2,2,4,4-tetramethyl-1,3-cyclobutanediol; 10 to 25 mole % 1,4-cyclohexanedimethanol and 75 to 90 mole % 2,2,4,4-tetramethyl-1,3-cyclobutanediol; 15 to 25 mole % 1,4-cyclohexanedimethanol and 75 to 85 mole % 2,2,4,4-tetramethyl-1,3-cyclobutanediol; 20 to 25 mole % 1,4-cyclohexanedimethanol and 75 to 80 mole % 2,2,4,4-tetramethyl-1,3-cyclobutanediol.

In other aspects of the invention, the glycol component for the polyesters useful in the invention include but are not limited to at least one of the following ranges: 0.01 to 20 mole % 1,4-cyclohexanedimethanol and 80 to 99.99 mole % 2,2,4,4-tetramethyl-1,3-cyclobutanediol; 1 to 20 mole % 1,4-cyclohexanedimethanol and 80 to 99 mole % 2,2,4,4-tetramethyl-1,3-cyclobutanediol; 5 to 20 mole % 1,4-cyclohexanedimethanol and 80 to 95 mole % 2,2,4,4-tetramethyl-1,3-cyclobutanediol; 10 to 20 mole % 1,4-cyclohexanedimethanol and 80 to 90 mole % 2,2,4,4-tetramethyl-1,3-cyclobutanediol; and 15 to 20 mole % 1,4-cyclohexanedimethanol and 80 to 85 mole % 2,2,4,4-tetramethyl-1,3-cyclobutanediol.

In other aspects of the invention, the glycol component for the polyesters useful in the invention include but are not limited to at least one of the following ranges: 0.01 to 15 mole % 1,4-cyclohexanedimethanol and 85 to 99.99 mole % 2,2,4,4-tetramethyl-1,3-cyclobutanediol; 1 to 15 mole % 1,4-cyclohexanedimethanol and 85 to 99 mole % 2,2,4,4-tetramethyl-1,3-cyclobutanediol; 5 to 15 mole % 1,4-cyclohexanedimethanol and 85 to 95 mole % 2,2,4,4-tetramethyl-1,3-cyclobutanediol; and 10 to 15 mole % 1,4-cyclohexanedimethanol and 85 to 90 mole % 2,2,4,4-tetramethyl-1,3-cyclobutanediol.

In other aspects of the invention, the glycol component for the polyesters useful in the invention include but are not limited to at least one of the following ranges: 0.01 to 10 mole % 1,4-cyclohexanedimethanol and 90 to 99.99 mole % 2,2,4,4-tetramethyl-1,3-cyclobutanediol; 1 to 10 mole % 1,4-cyclohexanedimethanol and 90 to 99 mole % 2,2,4,4-tetramethyl-1,3-cyclobutanediol; 5 to 10 mole % 1,4-cyclohexanedimethanol and 90 to 95 mole % 2,2,4,4-tetramethyl-1,3-cyclobutanediol; 0.01 to 5 mole % 1,4-cyclohexanedimethanol and 95 to 99.99 mole % 2,2,4,4-tetramethyl-1,3-cyclobutanediol and 1 to 5 mole % 1,4-cyclohexanedimethanol and 95 to 99 mole % 2,2,4,4-tetramethyl-1,3-cyclobutanediol.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.10 to 1.2 dL/g; 0.10 to 1.1 dL/g; 0.10 to 1 dL/g; 0.10 to less than 1 dL/g; 0.10 to 0.98 dL/g; 0.10 to 0.95 dL/g; 0.10 to 0.90 dL/g; 0.10 to 0.85 dL/g; 0.10 to 0.80 dL/g; 0.10 to 0.75 dL/g; 0.10 to less than 0.75 dL/g; 0.10 to 0.72 dL/g; 0.10 to 0.70 dL/g; 0.10 to less than 0.70 dL/g; 0.10 to 0.68 dL/g; 0.10 to less than 0.68 dL/g; 0.10 to 0.65 dL/g; 0.20 to 1.2 dL/g; 0.20 to 1.1 dL/g; 0.20 to 1 dL/g; 0.20 to less than 1 dL/g; 0.20 to 0.98 dL/g; 0.20 to 0.95 dL/g; 0.20 to 0.90 dL/g; 0.20 to 0.85 dL/g; 0.20 to 0.80 dL/g; 0.20 to 0.75 dL/g; 0.20 to less than 0.75 dL/g; 0.20 to 0.72 dL/g; 0.20 to 0.70 dL/g; 0.20 to less than 0.70 dL/g; 0.20 to 0.68 dL/g; 0.20 to less than 0.68 dL/g; 0.20 to 0.65 dL/g; 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g; 0.40 to 0.65 dL/g; greater than 0.42 to 1.2 dL/g; greater than 0.42 to 1.1 dL/g; greater than 0.42 to 1 dL/g; greater than 0.42 to less than 1 dL/g; greater than 0.42 to 0.98 dL/g; greater than 0.42 to 0.95 dL/g; greater than 0.42 to 0.90 dL/g; greater than 0.42 to 0.85 dL/g; greater than 0.42 to 0.80 dL/g; greater than 0.42 to 0.75 dL/g; greater than 0.42 to less than 0.75 dL/g; greater than 0.42 to 0.72 dL/g; greater than 0.42 to less than 0.70 dL/g; greater than 0.42 to 0.68 dL/g; greater than 0.42 to less than 0.68 dL/g; and greater than 0.42 to 0.65 dL/g.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g; greater than 0.76 dL/g to 1.2 dL/g; greater than 0.76 dL/g to 1.1 dL/g; greater than 0.76 dL/g to 1 dL/g; greater than 0.76 dL/g to less than 1 dL/g; greater than 0.76 dL/g to 0.98 dL/g; greater than 0.76 dL/g to 0.95 dL/g; greater than 0.76 dL/g to 0.90 dL/g; greater than 0.80 dL/g to 1.2 dL/g; greater than 0.80 dL/g to 1.1 dL/g; greater than 0.80 dL/g to 1 dL/g; greater than 0.80 dL/g to less than 1 dL/g; greater than 0.80 dL/g to 1.2 dL/g; greater than 0.80 dL/g to 0.98 dL/g; greater than 0.80 dL/g to 0.95 dL/g; greater than 0.80 dL/g to 0.90 dL/g.

It is contemplated that the polyester compositions of the invention can possess at least one of the inherent viscosity ranges described herein and at least one of the monomer ranges for the compositions described herein unless otherwise stated. It is also contemplated that the polyester compositions of the invention can posses at least one of the Tg ranges described herein and at least one of the monomer ranges for the compositions described herein unless otherwise stated. It is also contemplated that the polyester compositions of the invention can posses at least one of the Tg ranges described herein, at least one of the inherent viscosity ranges described herein, and at least one of the monomer ranges for the compositions described herein unless otherwise stated.

In certain embodiments, furandicarboxylic acid, or an ester thereof or a mixture of furandicarboxylic acid and an ester thereof, makes up most or all of the dicarboxylic acid component used to form the polyesters useful in the invention. In certain embodiments, 2,5-furandicarboxylic acid residues and/or its ester can be present at a concentration of at least 70 mole %, such as at least 80 mole %, at least 90 mole %, at least 95 mole %, at least 99 mole %, or 100 mole %. For purposes of this disclosure, the terms "2,5-furandicarboxylic acid" and its esters are used interchangeably herein. In certain embodiments, ranges of from 70 to 100 mole %; or 80 to 100 mole %; or 90 to 100 mole %; or 99 to 100 mole %; or 100 mole % 2,5-furandicarboxylic acid and/or its esters may be used. In certain embodiments, ranges of from 70 to 100 mole %; or 80 to 100 mole %; or 90 to 100 mole %; or 99 to 100 mole %; or 100 mole % 2,5-furandicarboxylic acid and/or its esters may be used.

In addition to 2,5-furandicarboxylic acid residues, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, or from 0.01 to 1 mole % of one or more modifying aromatic dicarboxylic acids. In one embodiment, modifying aromatic dicarboxylic acids that may be used in the present invention include but are not limited to those having up to 20 carbon atoms, and that can be linear, para-oriented, or symmetrical. Examples of modifying aromatic dicarboxylic acids which may be used in this invention include, but are not limited to, terephthalic acid, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, isophthalic acid is the modifying aromatic dicarboxylic acid. In one embodiment, terephthalic acid is the modifying aromatic dicarboxylic acid.

The carboxylic acid component of the polyesters useful in the invention can be further modified with up to 30 mole %, such as up to 25 mole % or such as up to such as up to 20 mole % or such as up to 15 mole % or such as up to 10 mole % or such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The 1,4-cyclohexanedimethanol may be cis, trans, or a mixture thereof, for example, a cis/trans ratio of 60:40 to 40:60. In another embodiment, the trans-1,4-cyclohexanedimethanol can be present in the amount of 60 to 80 mole %. For the desired polyester, the molar ratio of cis/trans 2,2,4,4-tetramethyl-1,3-cyclobutanediol can vary within the range of 50/50 to 100/0, for example, between 40/60 to 60/40. In certain embodiments, the amount of cis-2,2,4,4-tetramethyl-1,3-cyclobutanediol is greater than 50 mole %, or greater than 55 mole % or greater than 60 mole or greater than 65 mole % or greater than 70 mole % or greater than 75 mole %.

The glycol component of the polyester portion of the polyester compositions useful in the invention contain no more than 98 mole % of modifying glycols (glycols other than CHDM). In one embodiment, the polyesters useful in the invention can contain less than 30 mole % of one or more modifying glycols. In one embodiment, the polyesters useful in the invention can contain less than 25 mole % of one or more modifying glycols. In one embodiment, the polyesters useful in the invention can contain less than 20 mole % of one or more modifying glycols. In one embodiment, the polyesters useful in the invention can contain less than 15 mole % of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In another embodiment, the polyesters useful in the invention may contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the invention refer to that are not listed as a required diol and may contain 2 to 16 carbon atoms. Examples of suitable modifying glycols include, but are not limited to, diethylene glycol, ethylene glycol, 2,2,4,4-tetramethyl-1,3-cyclobutanediol, 1,2-propanediol, 1,3-propanediol, neopentyl glycol, 1,4-butanediol, 1,5-pentanediol, 1,6-hexanediol, p-xylene glycol, isosorbide, or mixtures thereof. In another embodiment, the modifying glycols include but are not limited to 1,3-propanediol and/or 1,4-butanediol. In another embodiment, at least one modifying glycol is isosorbide. In one embodiment, suitable modifying glycols include, but are not limited to, diethylene glycol, ethylene glycol, and 2,2,4,4-tetramethyl-1,3-cyclobutanediol. In one embodiment, suitable modifying glycols include, but are not limited to, ethylene glycol, and 2,2,4,4-tetramethyl-1,3-cyclobutanediol. In one embodiment, ethylene glycol is the modifying glycol. In one embodiment, 2,2,4,4-tetramethyl-1,3-cyclobutanediol is the modifying glycol.

The polyesters useful in the invention can also comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, or 0.1 to 0.5 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The glass transition temperature (Tg) of the polyesters useful in the invention was determined using a TA Instruments Q2000 DSC at a scan rate of 20° C./min.

In one embodiment, the polyesters of this invention can be visually clear. The term "visually clear" is defined herein as an appreciable absence of cloudiness, haziness, and/or muddiness, when inspected visually. In another embodiment, when the polyesters are blended with another polymer, the blends can be visually clear.

The polyesters useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

In another aspect, the invention relates to a process for producing a polyester. The process comprises:

(I) heating a mixture comprising the monomers useful in any of the polyesters useful in the invention in the presence of a catalyst at a temperature of 150 to 240° C. for a time sufficient to produce an initial polyester;

(II) heating the initial polyester of step (I) at a temperature of 240 to 320° C. for 1 to 4 hours; and (III) removing any unreacted glycols.

Suitable catalysts for use in this process include, but are not limited to, organo-zinc or tin compounds, including but not limited to, zinc acetate, butyltin tris-2-ethylhexanoate, dibutyltin diacetate, and/or dibutyltin oxide. Other catalysts may include, but are not limited to, those based on titanium, zinc, manganese, lithium, germanium, and cobalt. A phosphorus compound may be used in connection with this invention. In one embodiment, the catalyst can be a combination of manganese, cobalt and germanium which can be used with phosphorus compounds as described herein. In another embodiment, titanium and manganese can be used. In one embodiment, tetrabutyl titanate can be used in combination with manganese acetate. In one embodiment, titanium and tin catalysts can be combined. In one embodiment, tin can be used as the only catalyst. In one embodiment, titanium can be used as the only catalyst. The invention further relates to a polyester product made by the process described above.

The invention further relates to a polymer blend. The blend comprises:

(a) 0.01 to 99.99 weight % of at least one of the polyesters described above; and (b) 0.01 to 99.995 weight % of at least one of the polymeric components.

Suitable examples of the polymeric components include, but are not limited to, nylon, other polyesters different from those described herien, nylon, polyamides such as ZYTEL® from DuPont; polyesters different from those described herein; polystyrene, polystyrene copolymers, styrene acrylonitrile copolymers, acrylonitrile butadiene styrene copolymers, poly(methylmethacrylate), acrylic copolymers, poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); other polyesters; polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds or mixtures of any of the other foregoing polymers. The blends can be prepared by conventional processing techniques known in the art, such as melt blending or solution blending.

The polyesters according to the invention can also be used in blends, such blends being obtainable by means of reactive extrusion too, with polymers of natural origin, such as starch, cellulose, chitin and chitosan, alginates, proteins such as gluten, zein, casein, collagen, gelatine, natural rubbers, rosinic acid and its derivatives, lignins and their derivatives, natural fibers (such as for example jute, kenaf, hemp). The starches and celluloses may be modified and may include, for instance, the starch and cellulose esters with a degree of substitution coming between 0.2 and 2.5, hydroxypropylated starches, and modified starches with fatty chains. Starch can also be used in either destructurized or gelatinised form, or as a filler. The starch may represent the continuous or the dispersed phase, or it may be in co-continuous form. In the case of dispersed starch, the starch particles can have mean dimension of less than 1μ, or less than 0.5μ.

With regard to the starch particles dimension, these are measured in the transverse direction with respect to the direction of the extrusion flow or, anyhow, with respect to the direction of the material's output. The dimension of a starch particle is therefore measured on the bidimensional shape resulting from the transverse direction. The mean dimension is calculated as the numeral (or arithmetic) average of the particle diameters.

In case of a spherical particle the particle diameter corresponds to the diameter of the smaller circle in which the particle can be inscribed.

In case of a non-spherical particle the particle diameter (d) is calculated according to the following formula:

$$d=\sqrt{d_1 d_2}$$

where $d_1$ is the minor diameter and $d_2$ is the major diameter of the ellipse in which the particle can be inscribed or approximated.

Mixtures of polyesters according to the invention wherein starch represents the dispersed phase can form biodegradable polymeric compositions with good-resistance to ageing and to humidity. Indeed, these polymeric compositions can maintain a high tear strength even in condition of low humidity.

Such characteristics can be achieved when the water content of the composition during mixing of the component is kept between 1% and 15% by weight. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, or between 0.6 and 0.25 dl/g, or between 0.55 and 0.3 dl/g.

Desctructurized starch can be obtained before or during mixing with the polyesters according to the present invention in presence of plasticizers such as water, glycerol, di and poly glycerols, ethylene or propylene glycol, ethylene and propylene diglycol, polyethylene glycol, polypropylenglycol, 1,2 propandiol, trymethylol ethane, trymethylol propane, pentaerytritol, dipentaerytritol, sorbitol, erytritol, xylitol, mannitol, sucrose, 1,3 propanediol, 1,2 butanediol, 1,3 butanediol, 1,4 butanediol, 1,5 pentanediol, 1,5 hexanediol, 1,6 hexanediol, 1,2,6 hexanetriol, 1,3,5 hexanetriol, neopentyl glycol and polyvinyl alcohol prepolymers and polymers, polyols acetates, ehtoxylates and propoxylates, particularly sorbitol ethoxylate, sorbitol acetate, and pentaerythritol acetate. The quantity of high boiling point plasticizers (plasticizers different from water) used are generally from 0% to 50%, or from 10% to 30% by weight, relative to the starch.

Water can be used as a plasticizer in combination with high boiling point plasticizers or alone during the plastification phase of starch before or during the mixing of the composition and can be removed at the needed level by degassing on one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4,5 (the value relates to pK of the first carboxyl group in the case of polycarboxylic acids);

Esters with HLB values of between 5,5 and 8, obtained from polyols and from mono or polycarboxylic acids with less than 12 carbon atoms and with pK values greater than 4.5 (this value relates to the pK of the first carboxylic group in the case of polycarboxylic acids);

Esters with HLB values lower than 5.5 obtained from polyols and from fatty acids with 12-22 carbon atoms.

These compatibilizers can be used in quantities of from 0.2 to 40% weight and or from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated through reactive blending during compounding or can be produced in a separate process and then added during extrusion, In general block copolymers of an hydrophilic and an hydrophobic units are particularly suitable. Additives such as di and polyepoxides, di and poly isocyanates, isocyanurates, polycarbodiimmides and peroxides can also be added. They can work as stabilizers as well as chain extenders.

All the products above can help to create the needed microstructure.

The starch/polyester ratio can be comprised in the range 5/95% weight up to 60/40% by weight, or 10/90-45/55% by weight.

In such starch-based blends in combination with the polyesters of the present invention it is possible to add polyolefins, polyvinyl alcohol at high and low hydrolysis degree, ethylene vinylalcohol and ethylene vinylacetate copolymers and their combinations as well as aliphatic polyesters such as polybuthylenesuccinate, polybuthylenesuccinate adipate, polybuthylensuccinate adipate-caprolactate, polybuthylensuccinate-lactate, polycaprolactone polymers and copolymers, PBT, PET, PTT, polyamides, polybuthylen terephthalate adipates with a content of terephthalic acid between 40 and 70% with and without sulfonated groups with or without branches and possibly chain extended with diisocyanates or isocyanurates, polyurethanes, polyamide-urethanes, cellulose and starch esters such as acetate, propionate and butryate with substitution degrees between 1 and 3, or between 1.5 and 2.5, polyhydroxyalkanoates, poly L-lactic acid, poly-D lactic acid and lactides, their mixtures and copolymers.

The starch blends of the polyesters of the present invention can be easily processable in film blowing even at MFI (170° C., 5 kg) of 7 g/10 min. Moreover, they can have impact strength higher than 20 $kJ/m^2$, or higher than 30 $kJ/m^{2+}$ or higher than 45 $kJ/m^2$ (measured on blown film 30 μm thick at 10° C. and less than 5% relative humidity). Particularly resistant and easily processable compounds contain destructurized starch in combination with the polyesters of the invention and polylactic acid polymers and copolymers with and without additives such as polyepoxides, carbodiimmides and/ or peroxides.

The starch-base films can be even transparent in case of nanoparticles of starch with dimensions lower than 500 μm or lower than 300 μm. It is also possible to go from a dispersion of starch in form of droplets to a dispersion in which two co-continuous phases coexist and the blend is characterized for allowing a higher water content during processing.

In general, to obtain co-continuous structures it is possible to work either on the selection of starch with high amylopectine content and/or to add to the starch-polyester compositions block copolymers with hydrophobic and hydrophilic units. Possible examples are polyvinylacetate/polyvinylalcohol and polyester/polyether copolymers in which the block length, the balance between the hydrophilicity and hydrophobicity of the blocks and the quality of compatibilizer used can be suitably changed in order to finely adjust the microstructure of the starch-polyester compositions.

The polymers according to the invention can also be blended with polyolefins, such as polyethylene, polypropylene and their copolymers, polyvinyl alcohol, polyvinyl acetate, polyethyl vinyl acetate and polyethylene vinyl alcohol, polyester urethanes, polyurethanes, polyamides, polyureas and aromatic polyesters of the diacid diol type wherein the aromatic acid is 2.5 furandicarboxylic acid.

The polymers according to the invention can also be used as prepolymers in the production of polyurethanes and polyureas.

In one embodiment, the polyesters of the invention are blended with starch.

The polyesters according to the invention can also be used in blends with polymers of synthetic origin and with the previously-mentioned polymers of natural origin.

Binary and ternary blends of the polyester according to the present invention with biodegradable polyesters of the type disclosed above and/or with polymers of natural origin are particularly suitable for the production of films. Advantageously, the films obtained with said blends show excellent mechanical properties.

In one embodiments, the polyesters of the invention can be mixed with starch and polylactic acid.

Blends of the polyesters according the present invention with PLA are of particular interest because their high compatibility with PLA polymers and copolymers permits to cover materials with a wide range of rigidities—which makes these blends particularly suitable for injection molding and extrusion.

Moreover, blends of such polyesters with poly L-lactic acid and poly D-lactic acid or poly L-lactide and D-lactide where the ratio between poly L- and poly D-lactic acid or lactide is in the range 10/90-90/10, or 20/80-80/20, and the ratio between aliphatic-aromatic polyester and the polylactic acid or PLA blend is in the range 5/95-95/5, or 10/90-90/10, are of particular interest for the high thermal resistance. Polylactic acid or lactide polymers or copolymers are generally of molecular weight Mn in the range between 30,000 and 30,000 or between 50,000 and 250,000.

To improve the transparency and toughness of such blends and decrease or avoid a lamellar structure of polylactide polymers, it is possible to introduce other polymers as compatibilizers or toughening agents such as: polybutylene succinate and copolymers with adipic acid and or lactic acid and or hydroxyl caproic acid, polycaprolactone, aliphatic polymers of diols from C2 to C13 and diacids from C4 to C13, polyhydroxyalkanoates, polyvinylalcohol in the range of hydrolysis degree between 75 and 99% and its copolymers, polyvinylacetate in a range of hydrolysis degree between 0 and 70%, or between 0 and 60%. In one embodiment, the diols used in the polyesters of the invention can be chosen from ethylene glycol, propandiol, butanediol and the acids used in the polyesters of the invention can be chosen from: azelaic, sebacic, undecandioic acid, dodecandioic acid, brassylic acid and their combinations.

To maximize compatibility among the polyesters of the invention and polylactic acid it is very useful the introduction of copolymers with blocks having high affinity for the aliphatic-aromatic copolyesters of the invention, and blocks with affinity for the lactic acid polymers or copolymers. One embodiment of the invention can be block copolymers of the aliphatic aromatic copolymers of the invention with polylactic acid. Such block copolymers can be obtained taking the two original polymers terminated with hydroxyl groups and then reacting such polymers with chain extenders able to react with hydroxyl groups such as diisocyanates.

Examples are 1,6 hexamethylene diisocyanate, isophorone diisocyanate, methylene diphenildiisocyanate, toluene diisocyanate or the like. It is also possible to use chain extenders able to react with carboxylic groups like di and poly epoxides (e.g. bisphenols diglycidyl ethers, glycerol diglycidyl ethers) divinyl derivatives if the polymers of the blend are terminated with acid groups. It is possible also to use as chain extenders carbodiimmides, bis-oxazolines, isocyanurates etc.

The intrinsic viscosity of such block copolymers can be between 0.3 and l=1.5 dl/g, or between 0.45 and 1.2 dl/g. The amount of compatibilizer in the blend of aliphaticaromatic copolyesters and polylactic acid can be in the range between 0.5 and 50% by weight, or between 1 and 30% by weight, or between 2 and 20% by weight.

The polyesters according to the present invention can advantageously be blended also with nucleating agents and filler both of organic and inorganic nature.

Examples of nucleating agents include talc, saccharine sodium salt, calcium silicate, sodium benzoate, calcium titanate, boron nitride, zinc salts, porphyrin, chlorine, phlorin, porphodimethine, porphomethine, bacteriochlorin, isobacteriochorin, porphyrinogen, phorbin, isotactic polypropylene, PLA with low molecular weight and PBT.

In one embodiment, the amount of fillers can be in the range of 0.5-70% by weight, or 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, for example, less than 500 ntn or less than 300 nm, or less than 50 nm. In one embodiment, inorganic fillers can be selected from zeolites and silicates of various kind such as wollastonites, montmorillonites, hydrotalcites also funetionalised with molecules able to interact with starch and or the specific polyester. The use of such fillers can improve stiffness, water and gas permeability, dimensional stability and maintain transparency.

The biodegradable polyesters according to the invention are biodegradable according to the standard EN 13432.

The process for producing the polyesters according to the present invention can be conducted using any of the known processes according to the state of the art. In particular, the polyesters can be advantageously obtained using a polycondensation reaction. The copolyester polymerisation process can be advantageously conducted in the presence of a suitable catalyst. An example of a suitable catalyst might be the organometallc compounds of tin such as the derivatives of stannoic acid, or the compounds of titanium such as orthobutyl titanate, or the compounds of aluminium such as Al-triisopropyl, or of antimony and zinc.

In addition, the polyester compositions and the polymer blend compositions containing the polyesters useful in this invention may also contain from 0.01 to 25% by weight or 0.01 to 20% by weight or 0.01 to 15% by weight or 0.01 to 10% by weight or 0.01 to 5% by weight of the total weight of the polyester composition of common additives such as colorants, dyes, mold release agents, release agents that release the polymer from rolls of the manufacturing equipment, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers; functionalized polyolefins, such as those containing methyl acrylate and/or glycidyl methacrylate; styrene-based block copolymeric impact modifiers; and various acrylic core/shell type impact modifiers. For example, UV additives can be incorporated into articles of manufacture through addition to the bulk, through application of a hard coat, or through coextrusion of a cap layer. Residues of such additives are also contemplated as part of the polyester composition.

In the case of adding release agents which reduce adhesion to manufacturing equipment such as calendering rolls, these can be selected from the group comprising esters of fatty acids and amides, and metal salts, soaps, paraffin, or hydrocarbon waxes such as: zinc stearate, calcium stearate, aluminum stearate, stearamides, erucamides, behenamides, white beeswax, candelilla wax, LDPE with high MFI such as Eastman Epolene N21, Epolene E20, and Lofio HOB 7119.

An increase in the molecular weight of the polyesters can be advantageously obtained, for instance, by adding various organic peroxides during the extrusion process. The increase in the molecular weight of the biodegradable polyesters is easily detectable on observing the increase in the viscosity values after processing the polyesters with the peroxides.

Examples of peroxides that can advantageously be used are selected from the group of dialkyl peroxides, such as: benzoyl peroxide, lauroyl peroxide, isononanoyl peroxide, di-(tbutylperoxyisopropyl)benzene, t-butyl peroxide, dicumyl peroxide, alpha,alpha-di(t-20 butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-tbutylcyclohexyl)peroxydi-carbonate, dicetyl peroxydicarbonate, dimyristyl peroxydicarbonate, 3,69-triethyl-3,6,9-trimethyl-1,4,7-triperoxonan, di(2-ethylhexyl)peroxydicarbonate and mixtures thereof.

In one embodiment, peroxides can be added to the polyesters according to the invention in a quantity of less than 0.5% by weight, or less than 0.01-0.2% by weight, or less than 0.01-0.1% by weight.

The polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but can be selected from 0.1 percent by weight to about 10 percent by weight, or from 0.1 to about 5 percent by weight, based on the total weight of the polyester.

The polyesters of the invention can contain phosphorous compounds including but not limited to phosphoric acid, phosphorous acid, phosphonic acid, phosphinic acid, phosphonous acid, and various esters and salts thereof. These can be present in the polyester compositions useful in the invention. The esters can be alkyl, branched alkyl, substituted alkyl, difunctional alkyl, alkyl ethers, aryl, and substituted aryl. In one embodiment, the number of ester groups present in the particular phosphorous compound can vary from zero up to the maximum allowable based on the number of hydroxyl groups present on the phosphorus compound used. Examples of phosphorus compounds useful in the invention can include phosphites, phosphates, phosphinates, or phosphonites, including the esters thereof.

The polyesters of the invention can have good molecular weight. In one embodiment, the number average molecular weight of the polyesters is at least 10,000. In one embodiment, the number average molecular weight of the polyesters is at least 20,000.

Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials are glass, such as, fibrous glass filaments, mixtures of glass and talc, glass and mica, and glass and polymeric fibers.

In another embodiment, the invention further relates to articles of manufacture comprising any of the polyesters and blends described herein.

The present polyesters and/or polyester blend compositions can be useful in forming fibers, films, molded articles, foamed articles, containers, bottles and sheeting. The methods of forming the polyesters into fibers, films, molded articles, containers, and sheeting are well known in the art.

The invention further relates to articles of manufacture. These articles include, but are not limited to, injection molded articles, injection blow molded articles, injection stretch blow molded articles, extrusion blow molded articles, extrusion stretch blow molded articles, extrusion coatings, calendered articles, compression molded articles, and solution casted articles. Methods of making the articles of manufacture, include, but are not limited to, extrusion blow molding, extrusion stretch blow molding, injection blow molding, injection stretch blow molding, calendering, rotomolding, compression molding, and solution casting.

The polyesters according to the invention have properties and viscosity values that make them suitable, after adjusting their molecular weight, for use in numerous practical applications such as films, injection molded products, extrusion coatings, fibres, foams, thermoformed products, extruded profiles and sheets, extrusion blow molding, injection blow molding, rotomolding, stretch blow molding, etc.

In another embodiment, the invention further relates to articles of manufacture comprising the film(s) and/or sheet(s) containing polyester compositions described herein. In another embodiment, the invention relates to fibers. In yet another embodiment, the invention relates to foams. In another embodiment, this invention relates to thermoformed articles. In another embodiment, this invention relates to packaging materials.

The methods of forming polyesters into film(s) and/or sheet(s) are well known in the art. Examples of film production technologies include film blowing, casting and coestrusion. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Examples of potential articles made from film and/or sheet include, but are not limited to, uniaxially stretched film, biaxially stretched film, shrink film (whether or not uniaxially or biaxially stretched), liquid crystal display film (including, but not limited to, diffuser sheets, compensation films and protective films), thermoformed sheet, graphic arts film, outdoor signs, skylights, coating(s), coated articles, painted articles, laminates, laminated articles, and/or multiwall films or sheets.

Films obtained, with the polyester according to the present invention show excellent mechanical properties, such as for example an ultimate elongation greater than 350%, or greater than 400%, or greater than 500% with an ultimate energy greater than 70 $MJ/m^3$, or greater than 90 $MJ/m^3$ or greater than 100 $MJ/m^3$.

Moreover, such films can be subject to biorientation in line or after film production. The films can be also oriented through stretching in one direction with a stretching ratio from 1:2 up to 1:15, or from 1:2.2 up to 1:8. It is also possible that the stretching is obtained in presence of an highly filled material with inorganic fillers. In such a case, the stretching can generate microholes and the so obtained film can be particularly suitable for hygiene applications.

In particular, the polyesters according to the invention are suitable for manufacturing:

mono- and bi-oriented films, and films multilayered with other polymers;

films for use in the agricultural sector, such as films for use in mulching;

cling films for use with foodstuffs, for bales in agriculture, and for wrapping waste;

shrink film such as for example for pallets, mineral water, six pack rings, and so on;

bags and bin liners for the organic waste collection, e.g. the collection of food scraps and gardening waste;

thermoformed foodstuff packaging, both mono- and multi-layered, as in containers for milk, yogurt, meats, beverages, etc;

coatings obtained, using the extrusion coating method; multilayer laminates with rigid or flexible backings such as for example paper, plastic, aluminium, or metallic films;

foamed or foamable beads for the production of pieces obtained by sintering;

foamed and semi-foamed products, including foamed blocks formed using pre-expanded articles;

foamed sheets, thermoformed foam sheets, and containers obtained from them for use in foodstuff packaging;

fruit and vegetable containers in general; composites with gelatinised, destructured and/or complexed starch, natural starch, flours, other fillers of natural, vegetal or inorganic origin;

fibres, microfibres, composite fibres with a core consisting of rigid polymers, such as PLA, PET, PTT etc., and an external shell made using the material according to the invention, dablens composite fibres, fibres with different cross sections, from round to multilobed, fibres in flakes, woven and non-woven, or spun-bonded or thermobonded fabrics for use in sanitary and hygiene products, and in the agricultural and clothing sectors.

Other uses may also include applications in which the polyesters are used in lieu of plastic coated PVC.

As used herein, the abbreviation "wt" means "weight".

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

Unless otherwise specified, the cis/trans ratio of the 1,4 cyclohexanedimethanol used in the following examples was approximately 30/70, and could range from 35/65 to 25/75.

The following abbreviations apply throughout the working examples and figures:

| | |
|---|---|
| TPA | Terephthalic acid |
| DMT | Dimethyl terephthalate |
| CHDM | 1,4-cyclohexanedimethanol |
| TMCD | 2,2,4,4-tetramethyl-1,3-cyclobutanediol |
| FDCA | 2,5-Furandicarboxylic Acid |
| IhV or IV | Inherent Viscosity |
| $T_g$ | Glass transition temperature |
| EG | Ethylene Glycol |

All polymers in the examples were prepared by standard melt-phase polycondensation polymerization techniques known in the art. The polymer inherent viscosity (IhV) was measured by solution viscometry, using Phenol/1,1,2,2-tetrachloroethane (60/40) as a solvent. The polymer glass transition temperatures were measured by differential scanning calorimetry (DSC) with a TA Q2000 Differential Scanning calorimeter with refrigerated cooling accessory (RCA), with the first heating from 0 to 280° C. at 20° C./min, followed by cooling to 0° C. at 20° C./min, and heating again (second heating) from 0 to 280° C. at 20° C./min. The glass transition temperature (Tg) was recorded during the second heating cycle. Polymer compositions (mole percent glycols) were measured by proton nuclear magnetic resonance spectroscopy (NMR) using standard methods known in the art.

TABLE 1

Summary of Examples and Comparative Examples

| Example | Mole % TPA | Mole % FDCA | Mole % EG | Mole % CHDM | Mole % TMCD | IhV, dL/g | Tg, ° C. |
|---|---|---|---|---|---|---|---|
| Example 1 (PCF) | 0 | 100 | 0 | 100 | 0 | 0.81 | 86 |
| Example 2 | 0 | 100 | 0 | 73 | 27 | 0.70 | 96 |
| Example 3 | 100 | 0 | 0 | 72 | 28 | 0.70 | 114 |
| Example 4 (PEFG) | 0 | 100 | 69 | 31 | 0 | 0.76 | 84 |
| Example 5 (PCFG) | 0 | 100 | 41 | 59 | 0 | 0.90 | 85 |
| Example 6 (PET) | 100 | 0 | 100 | 0 | 0 | 1.00 | 80 |
| Example 7 (PETG) | 100 | 0 | 69 | 31 | 0 | 1.07 | 83 |
| Example 8 (PCTG) | 100 | 0 | 38 | 62 | 0 | 0.98 | 89 |
| Example 9 (PCT) | 100 | 0 | 0 | 100 | 0 | 0.85 | 95 |
| Example 10 (PEF) | 0 | 100 | 100 | 0 | 0 | 0.72 | 87 |

Example 1

Poly(1,4-cyclohexylenedimethylene furandicarboxylate), PCF

A 100 ml round-bottom flask fitted with a sidearm and condensate collection flask was charged with 0.1 mole FDCA (15.7 g), 0.11 mole CHDM (15.1 g), and a solution of titanium tetraisopropoxide in ethylene glycol such that the concentration of Ti was approximately 50 ppm based upon final polymer weight. The mixture was heated to 200° C. while stirring at atmospheric pressure under a N2 purge until a well-dispersed slurry was obtained. The temperature was then increased to 285° C. over a period of about 15 minutes, at which point a clear liquid melt was observed. The pressure was then slowly reduced to 0.5 Torr by means of a vacuum pump and held for about 60 minutes, collecting condensate in a sidearm flask cooled with dry ice located between the reaction flask and the vacuum pump. The resulting polymer was cooled to room temperature, separated from the flask, and cryogenically ground. The resulting polymer had IhV=0.81 dL/g and Tg=86° C.

Example 2

Poly(cyclohexylmethylene-tetramethylcyclobutylene furanoate)

A 500 ml round-bottom flask fitted with a sidearm and condensate collection flask was charged with 0.15 mole DMF (27.6 g), 0.11 mole CHDM (15.6 g), 0.05 mole (7.3 g) 2,2,4,4-tetramethyl-1,3-cyclobutanediol and a solution of tin (IV) catalyst such that the concentration of tin was approximately 200 ppm based upon final polymer weight. The mixture was heated to 200° C. for while stirring at atmospheric pressure under a N2 purge. The temperature was then slowly increased to 265° C. over a period of about one hour. The pressure was then slowly reduced to about 0.3 Torr by means of a vacuum pump and held for about 30 minutes, collecting condensate in a sidarm flask cooled with dry ice located between the reaction flask and the vacuum pump. The resulting polymer was cooled to room temperature, separated from the flask, and cryogenically ground. The resulting polymer had glycol composition 27 mole % TMCD and 73 mole % CHDM. The resulting polymer had IhV=0.70 dL/g and Tg=96° C.

Example 3

Poly(cyclohexylmethylene-tetramethylcyclobutylene terephthalate)

A 100 ml round-bottom flask fitted with a sidearm and condensate collection flask was charged with 0.15 mole DMT (29.1 g), 0.11 mole CHDM (15.6 g), 0.05 mole TMCD (7.1 g) and a solution of tin (IV) catalyst such that the concentration of tin was approximately 200 ppm based upon final polymer weight. The mixture was heated to 200° C. for while stirring at atmospheric pressure under a N2 purge. The temperature was then slowly increased to 265° C. over a period of about one hour. The pressure was then slowly reduced to about 0.3 Torr by means of a vacuum pump and held for about 30 minutes, collecting condensate in a sidarm flask cooled with dry ice located between the reaction flask and the vacuum pump. The resulting polymer was cooled to room temperature, separated from the flask, and cryogenically ground. The resulting polymer had glycol composition 28 mole & TMCD and 72 mole % CHDM. The resulting polymer had IhV=0.70 dL/g and Tg=114° C.

Example 4

Glycol-modified poly(ethylene furandicarboxylate), PEFG

A 100 ml round-bottom flask fitted with a sidearm and condensate collection flask was charged with 0.12 mole FDCA (18.7 g), 0.04 mole CHDM (5.6 g), 0.20 mole EG (12.5 g) and a solution of titanium tetraisopropoxide in ethylene glycol such that the concentration of Ti was approximately 50 ppm based upon final polymer weight. The mixture was heated to 200° C. for about 80 minutes while stirring at atmospheric pressure under a N2 purge. The pressure was then slowly reduced to 130 Torr by means of a vacuum pump and the temperature increased to 245° C. and held for about 30 minutes, collecting condensate in a sidearm flask cooled with dry ice located between the reaction flask and the vacuum pump. The pressure was then slowly reduced to 0.5 Torr and the temperature increased to 260° C. and held for about one hour. The resulting polymer was cooled to room temperature, separated from the flask, and cryogenically ground. The resulting polymer had a glycol constituent composition of about 31 mole percent CHDM. The resulting polymer had IhV=0.76 dL/g and Tg=84° C.

Example 5

Glycol-modified poly(1,4-cyclohexylenedimethylene furandicarboxylate), PCFG

A 100 ml round-bottom flask fitted with a sidearm and condensate collection flask was charged with 0.12 mole FDCA (18.7 g), 0.07 mole CHDM (10.7 g), 0.17 mole EG (10.3 g) and a solution of titanium tetraisopropoxide in ethylene glycol such that the concentration of Ti was approximately 50 ppm based upon final polymer weight. The mixture was heated to 200° C. for about 60 minutes while stirring at atmospheric pressure under a N2 purge. The pressure was then slowly reduced to 130 Torr by means of a vacuum pump and the temperature increased to 245° C. and held for about 30 minutes, collecting condensate in a sidearm flask cooled with dry ice located between the reaction flask and the vacuum pump. The pressure was then slowly reduced to 0.5 Torr and the temperature increased to 260° C. and held for about 80 minutes. The resulting polymer was cooled to room temperature, separated from the flask, and cryogenically ground. The resulting polymer had a glycol constituent composition of about 59 mole percent CHDM. The resulting polymer had IhV=0.90 dL/g and Tg=85° C.

Example 6

Poly(ethylene terephthalate), PET

A 100 ml round-bottom flask fitted with a sidearm and condensate collection flask was charged with 0.1 mole terephthalic acid, TPA, (16.6 g), 0.30 mole EG (18.6 g), and a solution of titanium tetraisopropoxide in ethylene glycol such that the concentration of Ti was approximately 500 ppm based upon final polymer weight. The mixture was heated to 185° C. for about 14 hours while stirring at atmospheric pressure under a N2 purge. The temperature was then increased to 230° C. for about 30 minutes. The temperature was then increased to about 245° C. for about 30 minutes, at which point a clear liquid melt was observed. The pressure was then slowly reduced to 130 Torr by means of a vacuum pump and the temperature increased to 260° C. and held for about 30 minutes, collecting condensate in a sidearm flask cooled with dry ice located between the reaction flask and the vacuum pump. The pressure was then slowly reduced to 0.5 Torr and the temperature increased to 275° C. and held for about 45 minutes. The resulting polymer was cooled to room temperature, separated from the flask, and cryogenically ground. The resulting polymer had IhV=1.00 dL/g and Tg=80° C.

Example 7

Glycol-modified poly(ethylene terephthalate), PETG

A 100 ml round-bottom flask fitted with a sidearm and condensate collection flask was charged with 0.12 mole terephthalic acid, TPA, (19.9 g), 0.04 mole CHDM (5.3 g), 0.20 mole EG (12.6 g), and a solution of titanium tetraisopropoxide in ethylene glycol such that the concentration of Ti was approximately 25 ppm based upon final polymer weight. The mixture was heated to 185° C. for about 17 hours while stirring at atmospheric pressure under a N2 purge. The temperature was then increased to 230° C. for about 60 minutes. The temperature was then increased to about 245° C. for about 60 minutes, at which point a clear liquid melt was observed. The pressure was then slowly reduced to 130 Torr by means of a vacuum pump and the temperature increased to 260° C. and held for about 60 minutes, collecting condensate in a sidearm flask cooled with dry ice located between the reaction flask and the vacuum pump. The pressure was then slowly reduced to 4 Torr and the temperature increased to 270° C. and held for about 30 minutes. The pressure was then slowly reduced to 0.5 Torr and held for about 90 minutes. The resulting polymer was cooled to room temperature, separated from the flask, and cryogenically ground. The resulting polymer had a glycol constituent composition of about 30 mole percent CHDM. The resulting polymer had IhV=1.07 dL/g and Tg=83° C.

Example 8

Glycol-modified poly(1,4-cyclohexylenedimethylene terephthalate), PCTG

A 100 ml round-bottom flask fitted with a sidearm and condensate collection flask was charged with 0.05 mole TPA, (8.3 g), 0.05 mole dimethyl terephthalate (DMT, 9.7 g), 0.07 mole CHDM (9.5 g), 0.13 mole EG (8.3 g), and a solution of titanium tetraisopropoxide in ethylene glycol such that the concentration of Ti was approximately 50 ppm based upon final polymer weight. The mixture was heated to 200° C. for about 60 minutes while stirring at atmospheric pressure under a N2 purge. The temperature was then increased to 210° C. and held for about 60 minutes. The temperature was then increased to 245° C. and held for about 45 minutes. The pressure was then slowly reduced to 130 Torr by means of a vacuum pump and the temperature increased to 260° C. and held for about 30 minutes, collecting condensate in a sidearm flask cooled with dry ice located between the reaction flask and the vacuum pump. The pressure was then slowly reduced to 4 Torr and the temperature increased to 275° C. and held for about 15 minutes. The pressure was then slowly reduced to 0.5 Torr and held for about 45 minutes. The resulting polymer was cooled to room temperature, separated from the flask, and cryogenically ground. The resulting polymer had a glycol constituent composition of about 62 mole percent CHDM. The resulting polymer had IhV=0.98 dL/g and Tg=89° C.

Example 9

Poly(1,4-cyclohexylenedimethylene terephthalate), PCT

A 500 ml round-bottom flask fitted with a sidearm and condensate collection flask was charged with 0.5 mole dimethyl terephthalate (DMT, 97.0 g), 0.55 mole CHDM (79.2 g) and a solution of titanium tetraisopropoxide in ethylene glycol such that the concentration of Ti was approximately 100 ppm based upon final polymer weight. The mixture was heated to 220° C. while stirring at atmospheric pressure under a N2 purge until a clear melt was obtained. The temperature was then increased to 290° C. over a period of about 30 minutes. The pressure was then slowly reduced to about 0.3 Torr by means of a vacuum pump and held for about 50 minutes, collecting condensate in a sidarm flask cooled with dry ice located between the reaction flask and the vacuum pump. The resulting polymer was cooled to room temperature, separated from the flask, and cryogenically ground. The resulting polymer had IhV=0.85 dL/g and Tg=95° C.

Example 10

Poly(ethylene furandicarboxylate), PEF

A 500 ml round-bottom flask fitted with a sidearm and condensate collection flask was charged with 0.5 mole FDCA (78.0 g), 1 mole EG (62.1 g), and a solution of titanium tetraisopropoxide in ethylene glycol such that the concentration of Ti was approximately 50 ppm based upon final polymer weight. The mixture was heated to 200° C. for about one hour while stirring at atmospheric pressure under a N2 purge. The temperature was then increased to 215° C. for about one hour. The pressure was then slowly reduced to about 0.3 Torr by means of a vacuum pump, and the temperature increased to 260° C. and held for about one to two hours, collecting condensate in a sidarm flask cooled with dry ice located between the reaction flask and the vacuum pump. The resulting polymer was cooled to room temperature, separated from the flask, and cryogenically ground. The resulting polymer had IhV=0.72 dL/g and Tg=87° C.

It can be clearly seen from a comparison of the data in the above relevant working examples that the polyesters of the present invention offer a definite advantage over the commercially available polyesters.

The invention has been described in detail with reference to the embodiments disclosed herein, but it will be understood that variations and modifications can be effected within the spirit and scope of the invention.

We claim:

1. A polyester composition comprising at least one polyester formed from solely one dicarboxylic component and solely one glycol component,
    (a) said dicarboxylic acid component comprising:
        i) 70 to 100 mole % of 2,5-furandicarboxylic acid residues;
        ii) 0 mole % of aromatic dicarboxylic acid residues having up to 20 carbon atoms; and
        iii) 0 to 30 mole % of aliphatic dicarboxylic acid residues having up to 16 carbon atoms; and
    (b) said glycol component comprising:
        i) 1 to 99 mole % of 1,4-cyclohexanedimethanol (CHDM) residues; and
        ii) 1 to 99 mole % of residues of a modifying glycol selected from the group consisting of diethylene glycol, ethylene glycol, 2,2,4,4-tetramethyl-1,3-cyclobutanediol, 1,2-propanediol, 1,3-propanediol, neopentyl glycol, 1,4-butanediol, 1,5-pentanediol, 1,6-hexanediol, p-xylene glycol, and mixtures thereof,
    wherein the total mole % of the dicarboxylic acid component is 100 mole %, and the total mole % of the glycol component is 100 mole %, and
    wherein the sum of the residues of CHDM and the modifying glycol is equal to 100 mole % of the glycol component.

2. The polyester composition of claim 1, wherein the inherent viscosity is from 0.35 to less than 1.0 dL/g.

3. The polyester composition of claim 1, wherein the inherent viscosity is from 0.35 to 0.80 dL/g.

4. The polyester composition of claim 1, wherein the inherent viscosity is from 0.50 to 0.75 dL/g.

5. The polyester composition of claim 1, wherein the glycol component comprises 15 to 80 mole % of 1,4-cyclohexanedimethanol residues.

6. The polyester composition of claim 1, wherein the glycol component comprises 25 to 50 mole % of 1,4-cyclohexanedimethanol residues.

7. The polyester composition of claim 1, wherein the glycol component of said polyester comprises 50 to 70 mole % of 1,4-cyclohexanedimethanol residues.

8. The polyester composition of claim 1, wherein the glycol component of said polyester comprises 5 to less than 50 mole % of 2,2,4,4-tetramethyl-1,3-cyclobutanediol residues and greater than 50 to 95 mole % of 1,4-cyclohexanedimethanol residues.

9. The polyester composition of claim 1, wherein the glycol component of said polyester comprises 10 to 30 mole % of 2,2,4,4-tetramethyl-1,3-cyclobutanediol residues and 70 to 90 mole % of 1,4-cyclohexanedimethanol residues.

10. The polyester composition of claim 1, wherein the glycol component comprises 30 to 40 mole % of 2,2,4,4-tetramethyl-1,3-cyclobutanediol residues and 60 to 70 mole % of 1,4-cyclohexanedimethanol residues.

11. The polyester composition of claim 1, wherein the glycol component comprises 25 to 50 mole % of 1,4-cyclohexanedimethanol residues and 50 to 75 mole % of ethylene glycol residues.

12. The polyester composition of claim 1, wherein the glycol component of said polyester comprises 50 to 70 mole % of 1,4-cyclohexanedimethanol residues and 30 to 50 mole % of ethylene glycol residues.

13. The polyester composition of claim 1, wherein the dicarboxylic acid component comprises 80 to 100 mole % of 2,5-furandicarboxylic acid residues.

14. The polyester composition of claim 1, wherein the dicarboxylic acid component comprises 90 to 100 mole % of 2,5-furandicarboxylic acid residues.

15. The polyester composition of claim 1, wherein said polyester composition comprises at least one polymer chosen from poly(etherimides), polyphenylene oxides, poly(phenylene oxide)/polystyrene blends, polystyrene resins, polyphenylene sulfides, polyphenylene sulfide/sulfones, poly (ester-carbonates), polycarbonates, polysulfones, polysulfone ethers, starches, cellulose esters, and poly(ether-ketones).

16. The polyester composition of claim 1, wherein said polyester comprises residues of at least one branching agent in an amount of 0.01 to 10 mole % based on the total mole percentage of the diacid or diol residues.

17. An article of manufacture comprising the polyester composition of claim 1.

18. An article of manufacture selected from film, fiber, sheet, bottle, foam, foamed article, thermoformed article or a coating according to claim 17.

19. The polyester composition of claim 1, wherein the polyester has a Tg in the range of 80 to 100° C. as the amount of CHDM residues is increased from 1 to 99 mole %.

20. The polyester composition of claim 1, wherein the polyester has a Tg in the range of 80 to 90° C. as the amount of CHDM residues is increased from 1 to 99 mole %.

* * * * *